(12) United States Patent
Horn et al.

(10) Patent No.: US 12,176,977 B2
(45) Date of Patent: Dec. 24, 2024

(54) SELECTION OF MOBILE STATION SIGNALING HARDWARE SELECTION

(71) Applicant: QUALCOMM Incorporated, San Diego, CA (US)

(72) Inventors: Idan Michael Horn, Hod Hasharon (IL); Yehonatan Dallal, Kfar Saba (IL); Shay Landis, Hod Hasharon (IL); Amit Bar-Or Tillinger, Tel-Aviv (IL)

(73) Assignee: QUALCOMM Incorporated, San Diego, CA (US)

( * ) Notice: Subject to any disclaimer, the term of this patent is extended or adjusted under 35 U.S.C. 154(b) by 157 days.

(21) Appl. No.: 18/052,105

(22) Filed: Nov. 2, 2022

(65) Prior Publication Data

US 2024/0146369 A1    May 2, 2024

(51) Int. Cl.
*H04B 7/02* (2018.01)
*H04B 7/06* (2006.01)

(52) U.S. Cl.
CPC .................. *H04B 7/0608* (2013.01)

(58) Field of Classification Search
CPC ..................................... H04B 7/0608
USPC ............... 375/267, 260, 259, 219, 295, 316
See application file for complete search history.

(56) References Cited

U.S. PATENT DOCUMENTS

| | | | |
|---|---|---|---|
| 2020/0260376 A1* | 8/2020 | Islam | H04W 52/0212 |
| 2021/0185515 A1* | 6/2021 | Bao | H04W 72/51 |
| 2022/0059943 A1* | 2/2022 | Saab | H04B 7/0617 |

* cited by examiner

*Primary Examiner* — Zewdu A Kassa
(74) *Attorney, Agent, or Firm* — Harrity & Harrity, LLP

(57) ABSTRACT

Various aspects of the present disclosure generally relate to wireless communication. In some aspects, a mobile station may transmit an indication of supported types of signaling hardware of the mobile station. The mobile station may receive an indication of a selection of a type of signaling hardware, of the supported types of signaling hardware, to use in communication with a network node. Numerous other aspects are described.

30 Claims, 11 Drawing Sheets

SELECTION OF MOBILE STATION SIGNALING HARDWARE SELECTION

FIELD OF THE DISCLOSURE

Aspects of the present disclosure generally relate to wireless communication and to techniques and apparatuses for selection of mobile station signaling hardware.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs (also referred to as "mobile stations"). A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a mobile station. The method may include transmitting, by the mobile station, an indication of supported types of signaling hardware of the mobile station. The method may include receiving, by the mobile station, an indication of a selection of a type of signaling hardware, of the supported types of signaling hardware, to use in communication with a network node.

Some aspects described herein relate to a method of wireless communication performed by a network node. The method may include receiving an indication of supported types of signaling hardware of a mobile station. The method may include transmitting an indication of a selection of a type of signaling hardware, of the supported types of signaling hardware, to use in communication with the mobile station.

Some aspects described herein relate to a mobile station for wireless communication. The mobile station may include a memory and one or more processors coupled to the memory. The one or more processors may be configured to transmit an indication of supported types of signaling hardware of the mobile station. The one or more processors may be configured to receive an indication of a selection of a type of signaling hardware, of the supported types of signaling hardware, to use in communication with a network node.

Some aspects described herein relate to a network node for wireless communication. The network node may include a memory and one or more processors coupled to the memory. The one or more processors may be configured to receive an indication of supported types of signaling hardware of a mobile station. The one or more processors may be configured to transmit an indication of a selection of a type of signaling hardware, of the supported types of signaling hardware, to use in communication with the mobile station.

Some aspects described herein relate to a non-transitory computer-readable medium that stores a set of instructions for wireless communication by a mobile station. The set of instructions, when executed by one or more processors of the mobile station, may cause the mobile station to transmit an indication of supported types of signaling hardware of the mobile station. The set of instructions, when executed by one or more processors of the mobile station, may cause the mobile station to receive an indication of a selection of a type of signaling hardware, of the supported types of signaling hardware, to use in communication with a network node.

Some aspects described herein relate to a non-transitory computer-readable medium that stores a set of instructions for wireless communication by a network node. The set of instructions, when executed by one or more processors of the network node, may cause the network node to receive an indication of supported types of signaling hardware of a mobile station. The set of instructions, when executed by one or more processors of the network node, may cause the network node to transmit an indication of a selection of a type of signaling hardware, of the supported types of signaling hardware, to use in communication with the mobile station.

Some aspects described herein relate to an apparatus for wireless communication. The apparatus may include means for transmitting an indication of supported types of signaling hardware of the apparatus. The apparatus may include means for receiving an indication of a selection of a type of signaling hardware, of the supported types of signaling hardware, to use in communication with a network node.

Some aspects described herein relate to an apparatus for wireless communication. The apparatus may include means for receiving an indication of supported types of signaling hardware of a mobile station. The apparatus may include means for transmitting an indication of a selection of a type of signaling hardware, of the supported types of signaling hardware, to use in communication with the mobile station.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
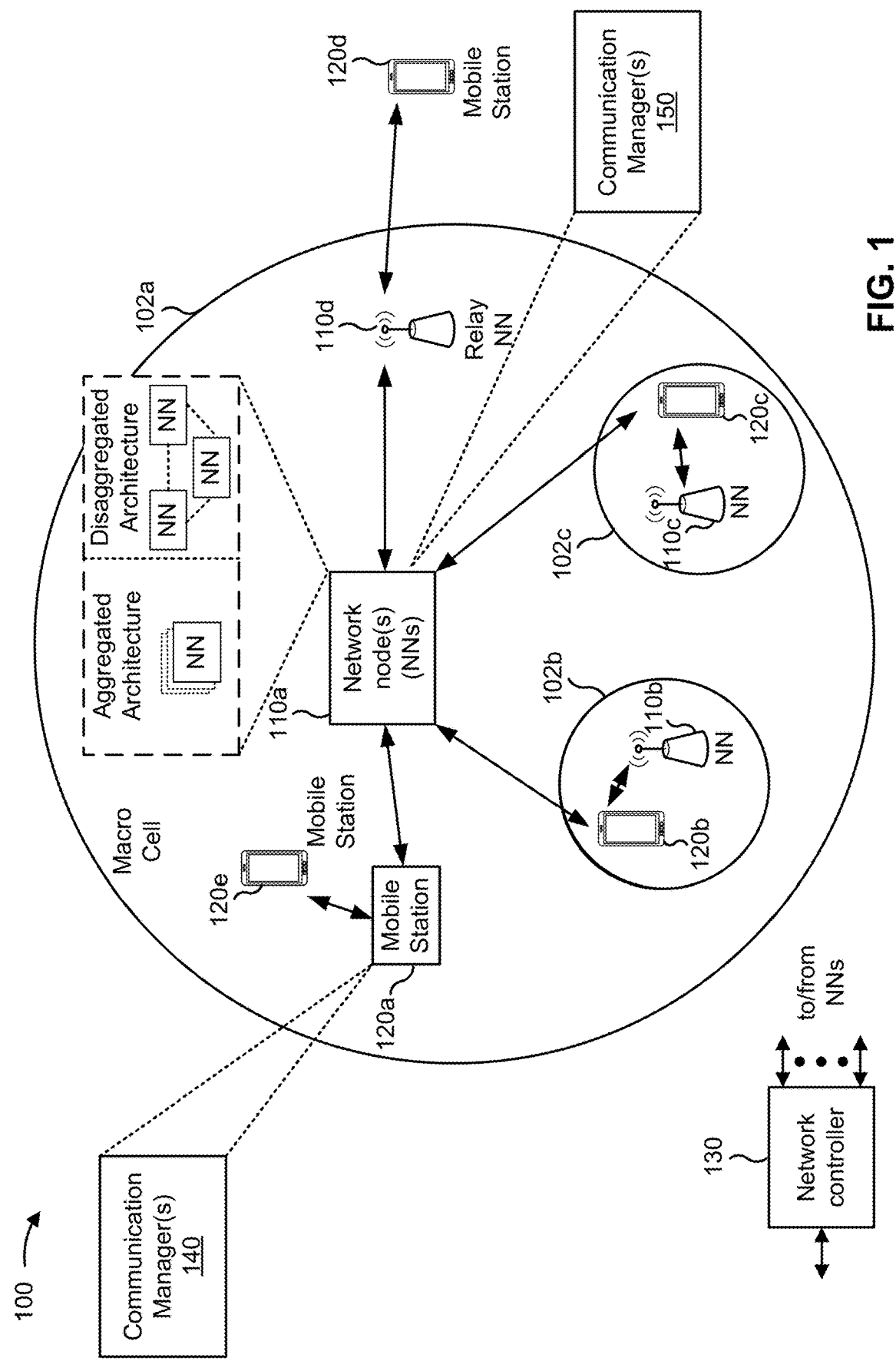
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110a, a network node 110b, a network node 110c, and a network node 110d), a user equipment (UE) 120 or multiple mobile stations 120 (shown as a mobile station 120a, a mobile station 120b, a mobile station 120c, a mobile station 120d, and a mobile station 120e), and/or other entities. A network node 110 is a network node that communicates with mobile stations 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with mobile stations 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by mobile stations 120 with service subscriptions. A pico cell may cover a relatively small geographic area and may allow unrestricted access by mobile stations 120 with service subscriptions. A femto cell may cover a relatively small geographic area (e.g., a home) and may allow restricted access by mobile stations 120 having association with the femto cell (e.g., mobile stations 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (e.g., three) cells. In some examples, a cell may not necessarily be stationary, and the geographic area of the cell may move according to the location of a network node 110 that is mobile (e.g., a mobile network node).

In some aspects, the term "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the term "base station" or "network node" may refer to one device configured to perform one or more functions, such as those described herein in connection with the network node 110. In some aspects, the term "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the term "base station" or "network node" may refer to any one or more of those different devices. In some aspects, the term "base station" or "network node" may refer to one or more virtual base stations or one or more virtual base station functions. For example, in some aspects, two or more base station functions may be instantiated on a single device. In some aspects, the term "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a mobile station 120) and send a transmission of the data to a downstream node (e.g., a mobile station 120 or a network node 110). A relay station may be a mobile station 120 that can relay transmissions for other mobile stations 120. In the example shown in FIG. 1, the network node 110d (e.g., a relay network node) may communicate with the network node 110a (e.g., a macro network node) and the mobile station 120d in order to facilitate communication between the network node 110a and the mobile station 120d. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The mobile stations 120 may be dispersed throughout the wireless network 100, and each mobile station 120 may be stationary or mobile. A mobile station 120 may include, for example, an access terminal, a terminal, a mobile station, and/or a subscriber unit. A mobile station 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a mobile station function of a network node, and/or any other suitable device that is configured to communicate via a wireless or wired medium.

Some mobile stations 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some mobile stations 120 may be considered Internet-of-Things (IoT) devices, and/or may be implemented as NB-IoT (narrowband IoT) devices. Some mobile stations 120 may be considered a Customer Premises Equipment. A mobile station 120 may be included inside a housing that houses components of the mobile station 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more mobile stations 120 (e.g., shown as mobile station 120a and mobile station 120e) may communicate directly using one or more sidelink channels (e.g., without using a network node 110 as an intermediary to communicate with one another). For example, the mobile stations 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a mobile station 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the mobile station may include a communication manager 140. As described in more detail elsewhere herein, the communication manager 140 may transmit an indication of supported types of signaling hardware of the mobile station; and receive an indication of a selection of a type of signaling hardware, of the supported types of signaling hardware, to use in communication with a network node. Additionally, or alternatively, the communication manager 140 may perform one or more other operations described herein.

In some aspects, the network node 110 may include a communication manager 150. As described in more detail elsewhere herein, the communication manager 150 may receive an indication of supported types of signaling hardware of a mobile station; and transmit an indication of a selection of a type of signaling hardware, of the supported types of signaling hardware, to use in communication with the mobile station. Additionally, or alternatively, the communication manager 150 may perform one or more other operations described herein.

As indicated above, FIG. 1 is provided as an example. Other examples may differ from what is described with regard to FIG. 1.

Figure 2:
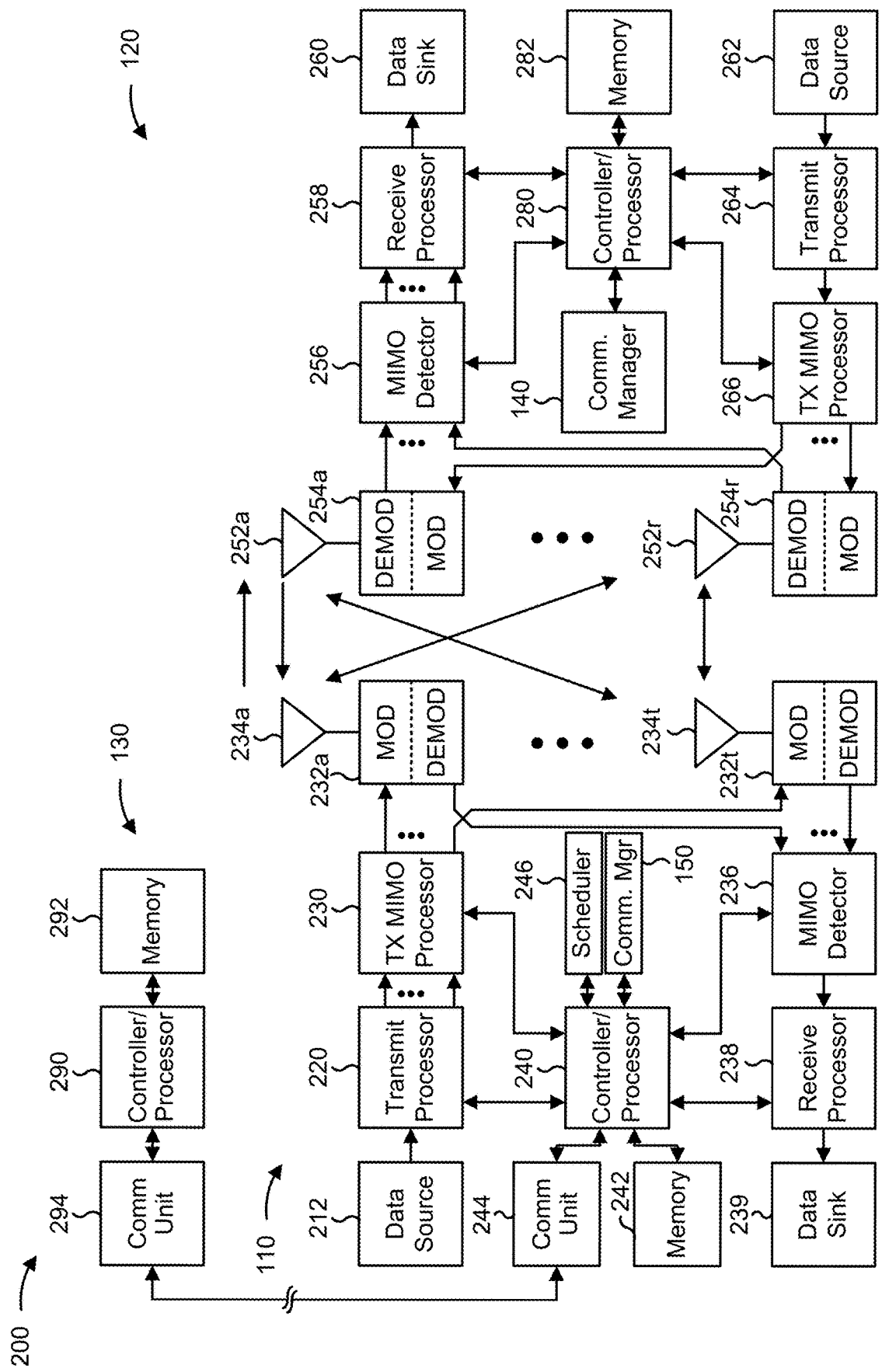
FIG. 2 is a diagram illustrating an example of a network node in communication with a user equipment (UE) in a wireless network, in accordance with the present disclosure.

FIG. 2 is a diagram illustrating an example 200 of a network node 110 in communication with a mobile station 120 in a wireless network 100, in accordance with the present disclosure. The network node 110 may be equipped with a set of antennas 234*a* through 234*t*, such as T antennas (T≥1). The mobile station 120 may be equipped with a set of antennas 252*a* through 252*r*, such as R antennas (R≥1). The network node 110 of example 200 includes one or more radio frequency components, such as antennas 234 and a modem 254. In some examples, a network node 110 may include an interface, a communication component, or another component that facilitates communication with the mobile station 120 or another network node. Some network nodes 110 may not include radio frequency components that facilitate direct communication with the mobile station 120, such as one or more CUs, or one or more DUs.

At the network node 110, a transmit processor 220 may receive data, from a data source 212, intended for the mobile station 120 (or a set of mobile stations 120). The transmit processor 220 may select one or more modulation and coding schemes (MCSs) for the mobile station 120 based at least in part on one or more channel quality indicators (CQIs) received from that mobile station 120. The network node 110 may process (e.g., encode and modulate) the data for the mobile station 120 based at least in part on the MCS(s) selected for the mobile station 120 and may provide data symbols for the mobile station 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232*a* through 232*t*. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232*a* through 232*t* may transmit a set of downlink signals (e.g., T downlink signals) via a corresponding set of antennas 234 (e.g., T antennas), shown as antennas 234*a* through 234*t*.

At the mobile station 120, a set of antennas 252 (shown as antennas 252*a* through 252*r*) may receive the downlink signals from the network node 110 and/or other network nodes 110 and may provide a set of received signals (e.g., R received signals) to a set of modems 254 (e.g., R modems), shown as modems 254*a* through 254*r*. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the mobile station 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the mobile station 120 may be included in a housing.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234*a* through 234*t* and/or antennas 252*a* through 252*r*) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the mobile station 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the mobile station 120 may include a modulator and a demodulator. In some examples, the mobile station 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 6-11).

At the network node 110, the uplink signals from mobile station 120 and/or other mobile stations may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the mobile station 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more mobile stations 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 6-11).

The controller/processor 240 of the network node 110, the controller/processor 280 of the mobile station 120, and/or any other component(s) of FIG. 2 may perform one or more techniques associated with selection of mobile station signaling hardware, as described in more detail elsewhere herein. For example, the controller/processor 240 of the network node 110, the controller/processor 280 of the mobile station 120, and/or any other component(s) of FIG. 2 may perform or direct operations of, for example, process 800 of FIG. 8, process 900 of FIG. 9, and/or other processes as described herein. The memory 242 and the memory 282 may store data and program codes for the network node 110 and the mobile station 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the mobile station 120, may cause the one or more processors, the mobile station 120, and/or the network node 110 to perform or direct operations of, for example, process 800 of FIG. 8, process 900 of FIG. 9, and/or other processes as described herein. In some examples, executing instructions may include running the instructions, converting the instructions, compiling the instructions, and/or interpreting the instructions, among other examples.

In some aspects, the mobile station includes means for transmitting, by the mobile station, an indication of supported types of signaling hardware of the mobile station; and/or means for receiving, by the mobile station, an indication of a selection of a type of signaling hardware, of the supported types of signaling hardware, to use in communication with a network node. In some aspects, the means for the mobile station to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the network node includes means for receiving an indication of supported types of signaling hardware of a mobile station; and/or means for transmitting an indication of a selection of a type of signaling hardware, of the supported types of signaling hardware, to use in communication with the mobile station. The means for the network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR BS, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
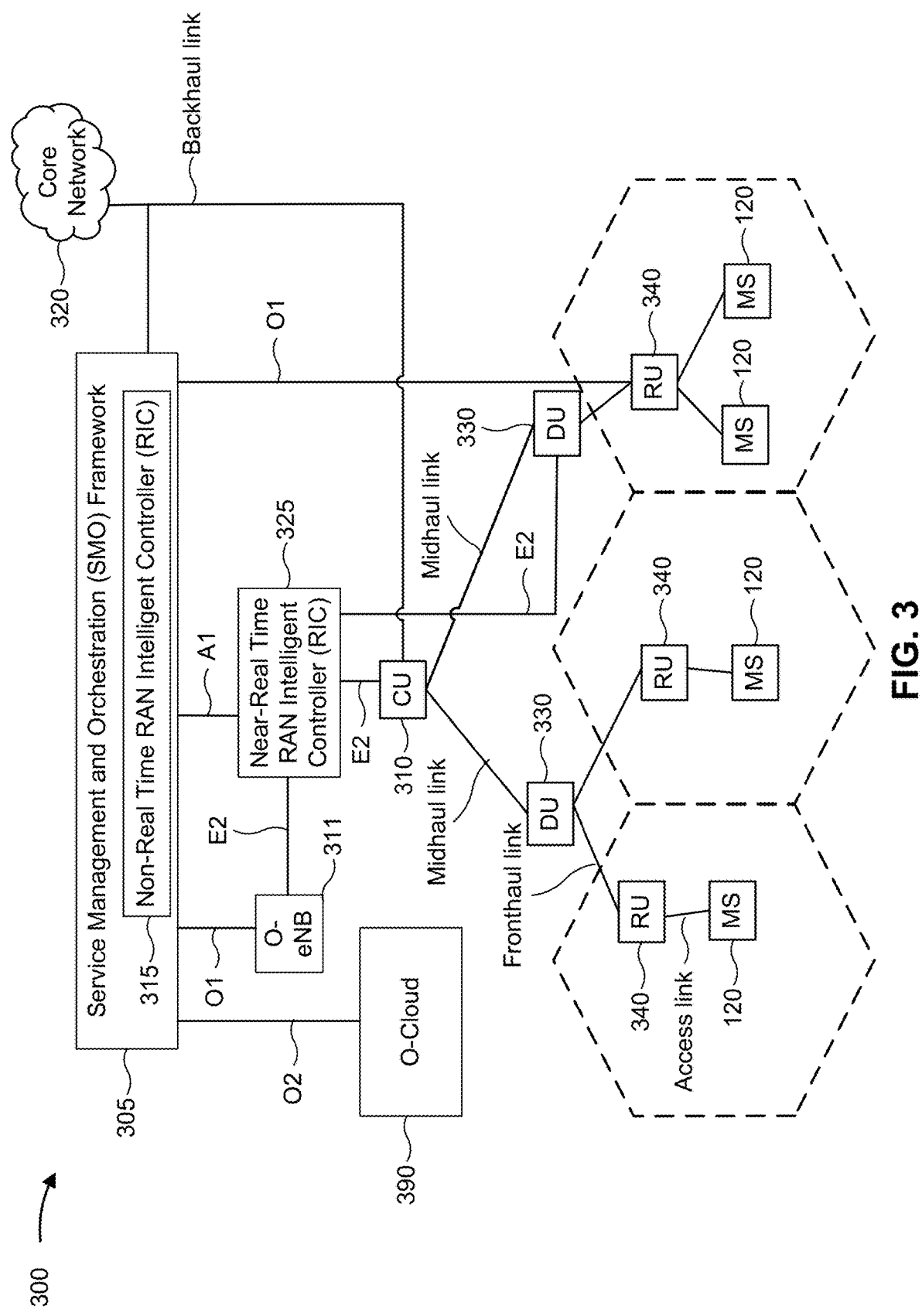
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more mobile stations (MSs) 120 via respective radio frequency (RF) access links. In some implementations, a mobile station 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more mobile stations 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT MC 325 and may be received at the SMO Framework 305 or the Non-RT MC 315 from non-network data sources or from network functions. In some examples, the Non-RT MC 315 or the Near-RT RIC 325 may be configured to tune RAN behavior or performance. For example, the Non-RT MC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

Figure 4:
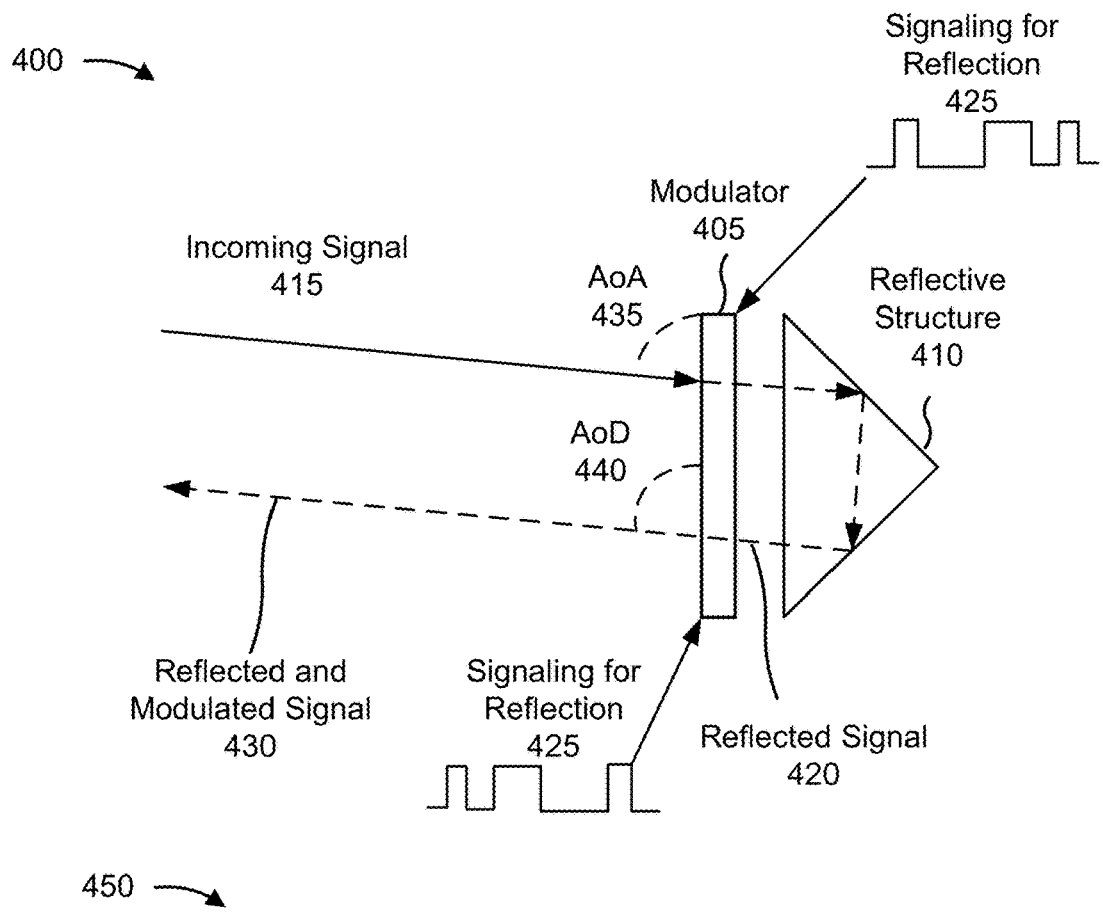
FIG. 4 is a diagram illustrating examples of modulate retro reflector (MRR) architectures, in accordance with the present disclosure.
Figure 4:
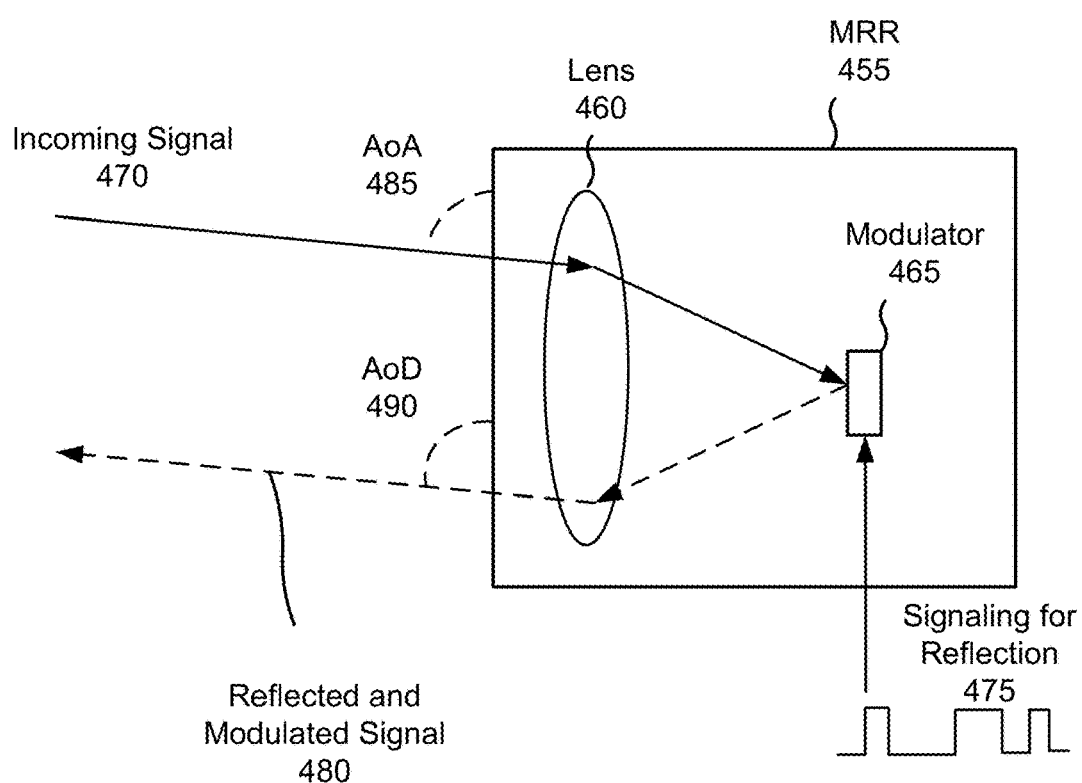

FIG. 4 is a diagram illustrating examples 400 and 450 of modulate retro reflector (MRR) architectures, in accordance with the present disclosure. The MRR architectures may be used by a first wireless communication device to provide a modulated signal (e.g., carrying data and/or control signaling) to a second wireless communication device. In MRR-based communications, the second wireless communication device (e.g., a network node) may provide a signal to the first wireless communication device (e.g., a mobile station), and the second wireless communication device may reflect the signal back to the first wireless communication device. In some examples, the first wireless communication device may modulate the signal before reflecting the signal to the second wireless communication device.

In some examples, the signal may be an electromagnetic field (EMF)-based signal, such as a laser-based signal. The signal may be referred to as a laser signal herein, which is intended to include any optical wireless communication (OWC) signal without limitation to a type of device used to generate the signal.

As shown in example 400, an MRR architecture may include a modulator 405 and a reflective structure 410. The modulator 405 be configured to absorb an incoming signal 415 (e.g., blocking the incoming signal 415) or to allow the incoming signal 415 to pass through the modulator 405. For example, the modulator 405 may be configured to modulate the incoming signal 415 based at least in part on alternating between absorbing the incoming signal 415 and allowing the incoming signal 415 to pass through the modulator 405 based at least in part on a signaling pattern desired to be provided back to the second wireless communication device.

Based at least in part on portions (e.g., at time resources) of the incoming signal 415 being passed through the modulator 405, the incoming signal 415 may interact with the reflective structure 410. In some examples, the reflective structure 410 may include two back surfaces that are perpendicular to each other and are configured to reflect the incoming signal 415. In this way, the incoming signal may be output as a reflected signal 420 that is in an opposite direction (e.g., rotated 180 degrees) from the incoming signal 415. In some examples, the back surfaces may include perpendicular reflective surfaces at a back end of a cavity of the reflective structure 410. In some examples, the reflective structure 410 may be a solid prism with back surfaces that reflect the incoming signal 415 based at least in part on internal reflection (e.g., based at least in part on an interface with a medium behind the reflective structure having a difference of refractive indices that causes internal reflection within the reflective structure 410).

In some examples, the modulator 405 may receive an input of signaling for reflection 425. The signaling for reflection may include a waveform that indicates data and/or control information for providing to the second wireless communication device. In some examples, the modulator 405 may apply the signaling for reflection 425 to the incoming signal 415 based at least in part on alternating between absorbing and passing through the incoming signal 415 and/or the reflected signal 420 with durations and a pattern that corresponds to the signaling for reflection 425. In this way, the MRR architecture may output a reflected and modulated signal 430 that carries data and/or control information based at least in part on application of modulation to the incoming signal 415 and/or the reflected signal 420.

As further shown in example 400, an angle of arrival (AoA) 435 of the incoming signal 415 may be approximately equal to an angle of departure (AoD) 440 of the reflected and modulated signal 430. In this way, the MRR architecture may provide the reflected and modulated signal 430 to the second wireless communication device without first performing beam management.

As shown in example 450, an MRR structure 455 may include a lens 460 and a modulator 465. The lens 460 may include a convex lens that focuses an incoming signal 470 on the modulator 465 (e.g., at a distance that is approximately equal to a focal length of the lens 460). The modulator 465 may include a reflective surface. The modulator 465 may include a multiple-quantum-well (MQW) modulator or another type of modulator that is configured to receive the incoming signal 470, apply a signaling for reflection 475 to the incoming signal 470, and output a reflected and modulated signal 480.

As further shown in example 450, an AoA 485 of the incoming signal 470 may be approximately equal to an AoD 490 of the reflected and modulated signal 480. In this way, the MRR architecture may provide the reflected and modulated signal 480 to the second wireless communication device without first performing beam management.

Other examples of MRR structures may be used to modulate and reflect an incoming signal. For example, the lens 460 may be replaced with a concave mirror and/or one or more convex lenses to focus the incoming signal 470 on the modulator 465. Additionally, or alternatively, the modulator 405 may be positioned to modulate only an incoming signal or only a reflected signal (e.g., based at least in part on positioning on only part of a surface of the reflective structure 410 that is nearest to the second wireless communication device along a transmission path of the incoming signal 415).

Based at least in part on using an MRR structure for communications with the second wireless communication device, the first wireless communication device may reduce power consumption relative to generating a signal for transmission to the second wireless communication device. Additionally, or alternatively, the first wireless communication device and the second wireless communication device may conserve power, computing, network, and communication resources that may have otherwise been used to perform beam management procedures to identify a direction for uplink communications.

As indicated above, FIG. 4 is provided as an example. Other examples may differ from what is described with regard to FIG. 4.

Figure 5:
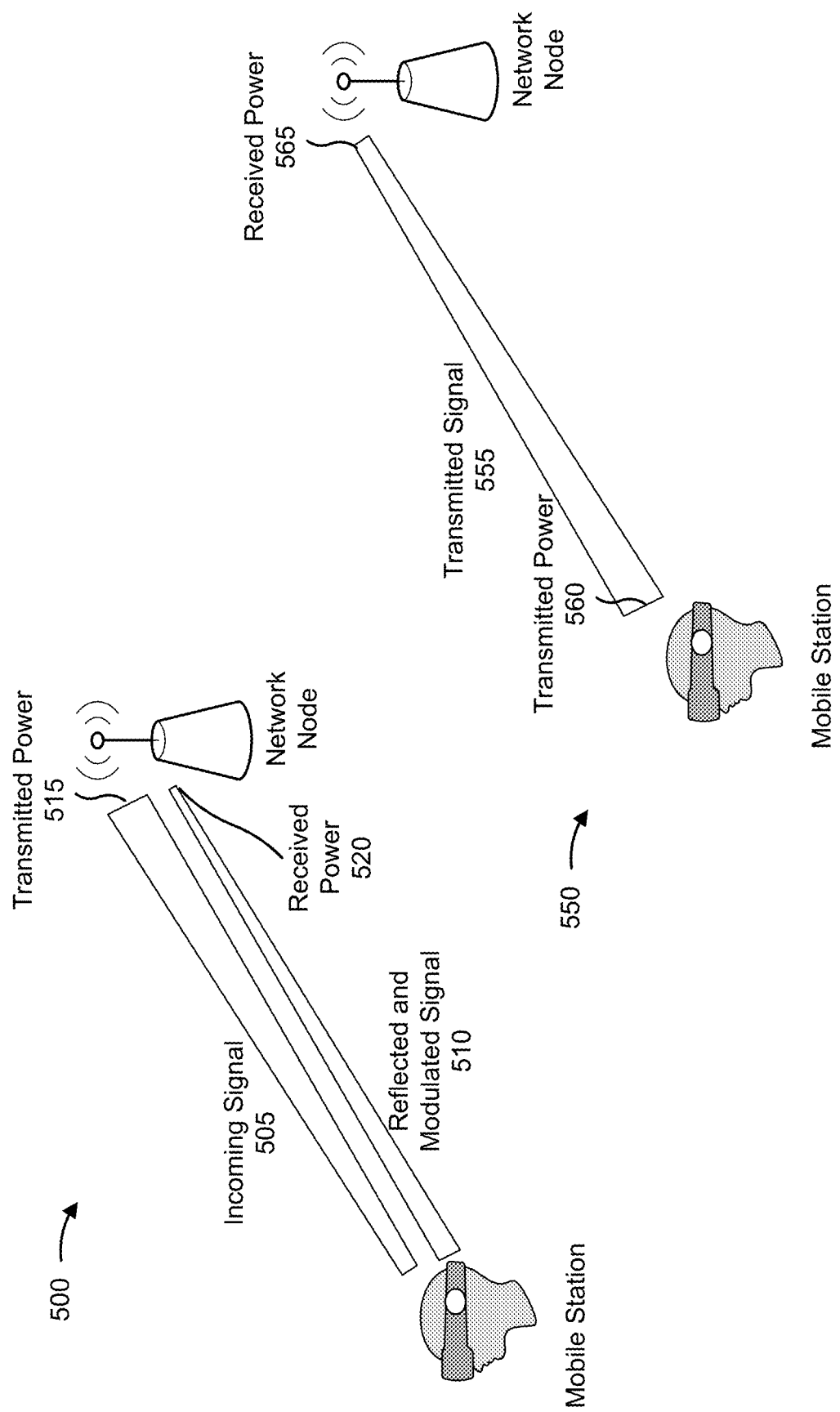
FIG. 5 is a diagram illustrating examples of optical wireless communication (OWC), in accordance with the present disclosure.

FIG. 5 is a diagram illustrating examples 500 and 550 of OWC, in accordance with the present disclosure. As shown in FIG. 5, a mobile station and a network node may communicate using OWC.

As shown in example 500, the mobile station may receive an incoming signal 505 from the network node. The mobile station may output, based at least in part on reflecting and modulating the incoming signal 505, a reflected and modulated signal 510 toward the network node.

Based at least in part on propagation over the air, the network node may transmit the incoming signal 505 with a transmitted power 515 and may receive the reflected and modulated signal 510 with a received power 520. In some examples, the transmitted power 515 may be reduced by a factor of a transmission distance with a power of two. In this way, the transmitted power 515 may be reduced by a factor of a distance between the mobile station and the network node with a power of two when it arrives at the mobile station, and may be reduced again by a factor of the distance between the mobile station and the network node with a power of two when it arrives at the network node. Based at least in part on using a reflected signal, signaling travels 2× the distance between the mobile station and the network node, and the transmitted power 515 is reduced by a factor of the distance between the mobile station and the network node with a power of four before being received with the received power 520.

In some examples, reduction of the transmitted power 515 by a factor of the distance between the mobile station and the network node with a power of four is acceptable based at least in part on the received power 520 being sufficiently high for reception and demodulation by the network node. In these examples, the mobile station may conserve power resources relative to generating and transmitting a modulated signal.

As shown in example 550, the mobile station may generate and transmit a transmitted signal 555 having a transmitted power 560 at the mobile station and a received power 565 at the network node. Based at least in part on the transmitted signal 555 being generated at the mobile station, instead of being a reflection of a signal transmitted at the network node, the received power 565 may be reduced by a factor of the distance between the mobile station and the network node with a power of two before being received with the received power 565.

In this way, propagation loss may be reduced, which may result in the received power 565 being greater than the received power 520. However, based at least in part on the mobile station generating and transmitting the transmitted signal 555, the mobile station may consume additional power resources that may have otherwise been conserved in example 500. Example 550 may be used in communications where the received power 520 is insufficient for reception and demodulation by the network node.

As indicated above, FIG. 5 is provided as an example. Other examples may differ from what is described with regard to FIG. 5.

Laser-based OWC may be used in wireless communication networks, such as 6G and/or future generation cellular networks, personal area networks (PANs), wide area networks (WANs), and/or local area networks (LANs), among other examples. For example, laser-based OWC may be used for indoor extended reality (XR) devices (e.g., goggles or other display) used for gaming, computer-aided design (CAD) or other architectural or structural visualization, holographic conferencing, and/or other XR applications.

Laser-based OWC may be used for short range, high throughput, low latency communications. As described herein, an MRR device is capable of modulating an incoming laser beam (e.g., with a high bandwidth) and reflecting it back at an opposite angle from which it arrived (e.g., rotated 180 degrees toward a transmitting device).

Introducing an MRR into XR communications may allow simpler, power efficient mobile station designs, where no laser is required at a mobile station (e.g., an XR device). Additionally, or alternatively, beam management on the mobile station may be simplified based at least in part on the beam being automatically reflected back along the angle of arrival (e.g., no need for a P3 beam management procedure). In some examples, an asymmetric link using MRR OWC may support small, wide field of view optics at the mobile station (e.g., the mobile station is able to receive an incoming signal with a wide aperture and still reflect back the signal toward a transmitting device).

A link budget of the OWC may be based at least in part on a link distance, an MRR implementation (e.g., radar cross section (RCS), an AoA, weather conditions, and/or laser output power at the transmitting device (e.g., a network node)).

In some examples, a network node laser output power may be insufficient for MRR communication (e.g., based at least in part on a loss of power that is reduced by a factor of the link distance with power of 4) and a mobile station laser (e.g., based at least in part on a loss of power that is reduced by a factor of the link distance with power of 2) may be used to replace the MRR. In some examples (e.g., with relatively small distances), a received power at the network node with the MRR may be larger than a received power of a mobile station laser signal based at least in part on an output power of a network node laser being larger than an output power of the mobile station laser (e.g., based at least in part on power constraints and/or safety parameters, among other examples).

In some networks that use a mobile station laser for uplink communications to a network node, the mobile station may consume additional power resources of the mobile station relative to using an MRR or other reflected signal communication system. In some networks that use MRR or another reflected signal communication system, a received power at the network node may be insufficient for reception and demodulation at the network node, which may cause communication errors that consume power, computing, communication, and/or network resources to detect and correct.

In some aspects described herein, a network node may indicate activation or deactivation of a mobile station laser (e.g., or other OWC device) and/or an MRR (e.g., or other reflector communication system). The network node may optimize a link budget with consideration of mobile station power consumption (e.g., based at least in part on operation of the mobile station laser and/or the MRR). In some aspects, the mobile station may provide information for the network node to optimize the link budget with consideration of the mobile station power consumption. For example, the mobile station may indicate power consumption for different signaling hardware types (e.g., mobile station laser or MRR, among other examples) and/or candidate power consumption for individual hardware types (e.g., supported transmission powers of the mobile station laser).

In some aspects, the mobile station is configured to communication using MRR for an OWC link to the network node. The network node may estimate a received power and calculate an expected received power if a mobile station laser is activated for communicating via the OWC link. Based at least in part on the received power using only the MRR being insufficient for communications via the OWC, the network node may indicate that the mobile station is to activate a mobile station laser to improve a signal-to-interference-plus-noise ratio (SINR) of the OWC link. The mobile station may activate the mobile station laser to transmit in a same direction of a network node downlink beam. In some aspects, the direction used by the mobile station laser may be based at least in part on an estimation of an AoA of a downlink beam, and/or may be based at least in part on an indication of the direction from the network node. In some aspects, the network node may disable the MRR to reduce inter-symbol interference (e.g., based at least in part on different propagation times) or may add the mobile station laser to MRR operation for additive power of an uplink signal as received at the network node.

In some examples, during a connection procedure or an exchange of configuration information, a mobile station may report to a network node to indicate reflection-based communication (e.g., MRR) and/or laser communication capabilities. For example, the mobile station may indicate supported output powers of a mobile station laser, a half power beam width (HPBW), supported AoD, power consumption per output power (e.g., for the network node to use to optimize mobile station power consumption with a budget link), and/or a distance to waist (e.g., a distance from the mobile station laser to a narrowest part of a laser output), among other examples. The mobile station may indicate, for the reflection-based communication capabilities, supported AoD, red cross section (RCS) (a loss of reflected signal energy from a reflector, such as an MMR or RIS, among other examples), and/or power consumption, among other examples.

The network node may identify a link budget based at least in part on the information provided by the mobile station and/or based at least in part on channel conditions (e.g., estimated from uplink received power).

The network node may request the mobile station to enable each signaling hardware (e.g., the MRR and the mobile station laser) to signal during different time allocations for the network node to estimate a link budget per signaling hardware. In this way, the network node may identify added power when the mobile station uses different signaling hardware and/or interference when the mobile station uses multiple types of signaling hardware.

In some aspects, the network node may consider a mobile station power consumption and/or a battery status of the mobile station as bases for whether to activate a type of signaling hardware (e.g., a mobile station laser). The network node may select signaling hardware of the mobile station to be used for communicating with the network node (e.g., a selection that provides sufficient received power at the network node and minimizes mobile station power consumption) and indicate the selection to the mobile station. For example, the network node may transmit an indication to activate or deactivate a mobile station laser for communication with the network node. The network node may transmit the indication periodically (e.g., at set intervals between indications) or a-periodically (e.g., using MAC control element (CEs) or RRC messages).

In some aspects, the network node may select multiple types of communication hardware for communication with the network node. For example, the network node may determine whether to disable the MRR based at least in part on indicating to use a mobile station laser. Disabling the MRR may improve inter-symbol interference, and leaving the MRR in use with the laser may increase received power.

In some aspects, the network node may indicate a selection of an output power of a selected signaling hardware. For example, the network node may select an output power of the mobile station laser, with the selection based at least in part on avoiding or reducing low noise amplifier (LNA) saturation and/or to support mobile station power efficiency.

In some aspects, the mobile station may provide feedback on the selection by the network node. For example, the mobile station may request to deactivate a high power consuming signaling hardware, such as the mobile station laser, based at least in part on power parameters (e.g., a power state, a power setting, and/or power consumption of an additional process, among other examples). In some aspects, the mobile station may request to activate a signaling hardware based at least in part on a steering capability of the signaling hardware. For example, the mobile station may request to deactivate a signaling hardware based at least in part on failing to support an AoD for transmission to the network node. In some aspects, the mobile station may switch signaling hardware based at least in part on providing the feedback, identifying a limitation of an active signaling hardware (e.g., switching without an indication from the network node to switch), and/or receiving an indication to switch signaling hardware from the network node, among other examples.

Examples described herein relate to signaling hardware, such as MRR and mobile station lasers. Similarly, in some networks (e.g., in lower bands, such as FR1 and FR2) the signaling hardware may include a transmit array (e.g., an antenna group for RF transmission similar to the mobile station laser) and/or a reflective intelligent surface (RIS) (e.g., a device that reflects radio waves similar to the MRR).

Based at least in part on supporting mobile station signaling hardware selection and/or reselection, the mobile station and the network node may adjust to changing conditions and/or mobile station states to optimize a link budget (e.g., received signal strength of uplink signals) and power consumption of the mobile station. For example, when a reflective signaling hardware (e.g., MRR) provides sufficient signal strength to the network node, the mobile station may be configured to conserve power resources that may have otherwise been used to generate and transmit uplink signaling (e.g., via a laser). Alternatively, when the reflective signaling hardware fails to provide sufficient signal strength to the network node, the mobile station may be configured to generate and transmit the uplink signaling (e.g., via the laser), which may reduce communication errors and conserve power, computing, communication, and/or network resources to detect and correct communication errors.

Figure 6:
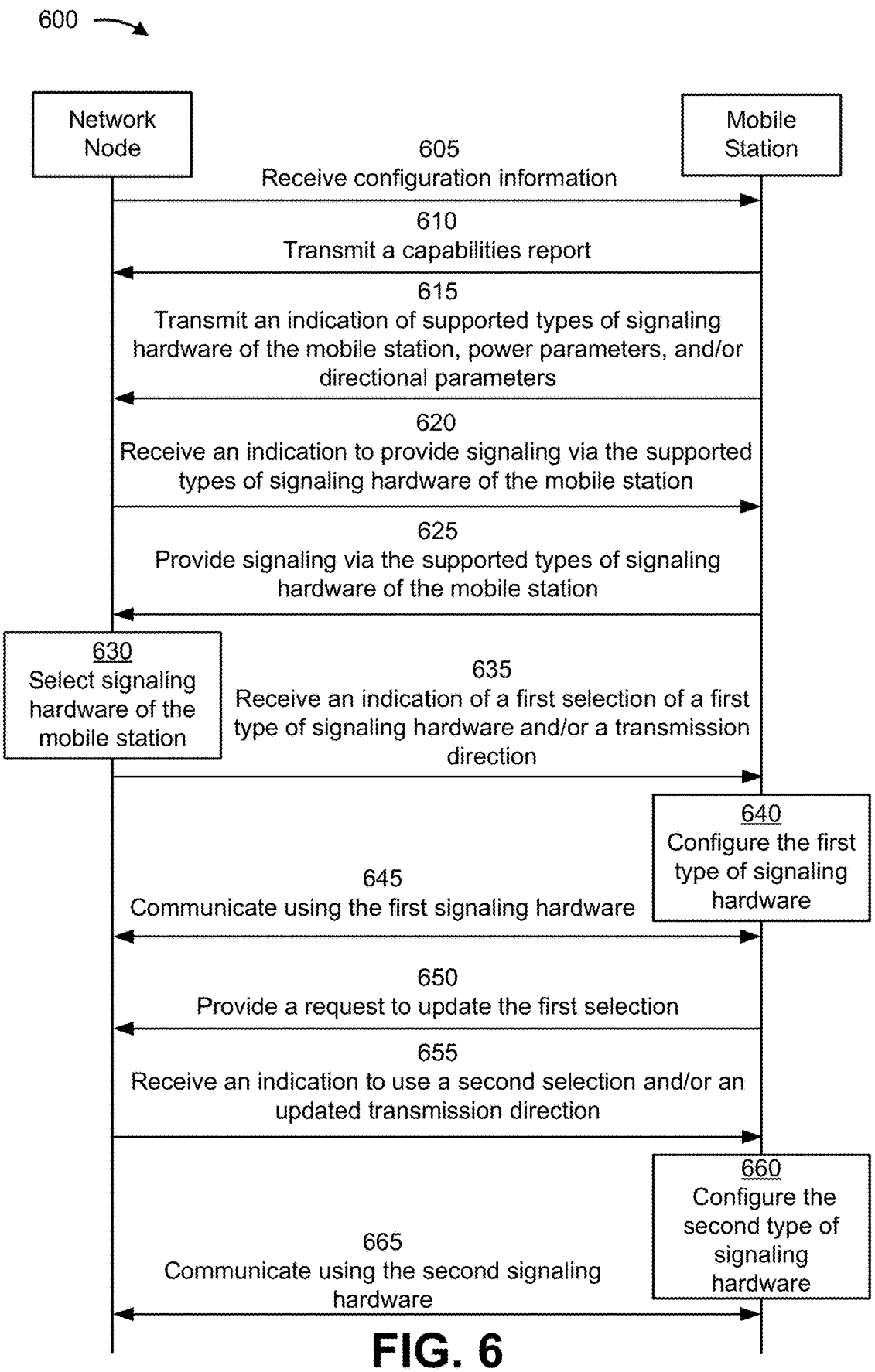
FIG. 6 is a diagram of an example associated with selection of mobile station signaling hardware, in accordance with the present disclosure.

FIG. 6 is a diagram of an example 600 associated with selection of mobile station signaling hardware, in accordance with the present disclosure. As shown in FIG. 6, a network node (e.g., network node 110, a CU, a DU, and/or an RU) may communicate with a mobile station (e.g., mobile station 120). In some aspects, the network node and the mobile station may be part of a wireless network (e.g., wireless network 100). The mobile station and the network node may have established a wireless connection prior to operations shown in FIG. 6. In some aspects, the mobile station may include multiple types of signaling hardware, such as a mobile station laser, an antenna group, and/or a reflective signaling hardware (e.g., MRR).

As shown by reference number 605, the network node may transmit, and the mobile station may receive, configuration information. In some aspects, the mobile station may receive the configuration information via one or more of RRC signaling, one or more MAC CEs, and/or downlink control information (DCI), among other examples. In some aspects, the configuration information may include an indication of one or more configuration parameters (e.g., already known to the mobile station and/or previously indicated by the network node or other network device) for selection by the mobile station, and/or explicit configuration information for the mobile station to use to configure the mobile station, among other examples.

In some aspects, the configuration information may indicate that the mobile station is to transmit a capabilities report to indicate whether the mobile station supports multiple types of signaling hardware. In some aspects, the configuration information may indicate that the mobile station is to transmit an indication of supported types of signaling hardware, power parameters associated with the supported types of signaling hardware, and/or directional parameters associated with the supported types of signaling hardware (e.g., limits on AoD for transmissions).

The mobile station may configure itself based at least in part on the configuration information. In some aspects, the mobile station may be configured to perform one or more operations described herein based at least in part on the configuration information.

As shown by reference number 610, the mobile station may transmit, and the network node may receive, a capabilities report. In some aspects, the capabilities report may indicate mobile station support for multiple types of signaling hardware. In some aspects, the capabilities report may indicate that the mobile station supports switching between types of signaling hardware and/or simultaneous use of multiple types of signaling hardware. In some aspects, the capabilities report may indicate an amount of time (e.g., processing time and/or configuring time) for switching between different types of signaling hardware.

As shown by reference number 615, the mobile station may transmit and the network node may receive, an indication of supported types of signaling hardware of the mobile station, power parameters, and/or directional parameters. In some aspects, the supported types of signaling hardware include reflective signaling hardware (e.g., an MRR or an RIS, among other examples), radio frequency signaling hardware (e.g., an antenna group), and/or optical wireless communication hardware (e.g., a mobile station laser and/or an MRR, among other examples).

In some aspects, the mobile station may indicate power consumption parameters associated with the supported types of signaling hardware of the mobile station. For example, the mobile station may indicate a first power consumption rate associated with a first signaling hardware and a second power consumption rate associated with a second signaling hardware. In some aspects, the mobile station may indicate an indication of power loss (e.g., of a reflected signal) associated with use of a signaling hardware.

In some aspects, the mobile station may indicate multiple candidate transmission powers associated with the type of signaling hardware. In some aspects, the mobile station may indicate power consumption parameters associated with the multiple candidate transmission powers (e.g., a first power consumption rate associated with using a first candidate transmission power and a second power consumption rate associated with using a second candidate transmission power).

In some aspects, the mobile station may indicate one or more transmission parameters and/or beam parameters associated with a signaling hardware. For example, the mobile station may indicate a half power beam width associated with the type of signaling hardware, supported angles of departure associated with the type of signaling hardware, and/or an indication of a distance to waist associated with the type of signaling hardware, among other examples.

As shown by reference number 620, the mobile station may receive, and the network node may transmit, an indication to provide signaling via the supported types of signaling hardware of the mobile station. In some aspects, the network node may indicate resources to be used by the supported types of signaling hardware for providing uplink signaling.

As shown by reference number 625, the mobile station may provide, and the network node may receive, signaling via the supported types of signaling hardware of the mobile station. For example, the mobile station may generate and transmit signals from a first type of signaling hardware during a first resource and may reflect signals from a second type of signaling hardware during a second resource. In some aspects, the mobile station may generate and transmit signals from the first type signaling hardware during a same resource as reflecting signals from a second type of signaling hardware. In this way, the network node may identify inter-symbol interference when both types of signaling hardware are in use.

As shown by reference number 630, the network node may select signaling hardware of the mobile station for use in communications with the network node. In some aspects, the network node may select the signaling hardware based at least in part on power consumption parameters associated with supported types of hardware of the mobile station, a link budget of a link between the mobile station and the network node, and/or a power state of the mobile station, among other examples. For example, the network node may select the signaling hardware based at least in part on received power when the mobile station uses different and/or combinations of the signaling hardware and/or based at least in part on power parameters of the mobile station (e.g., power consumption, a power state, and/or available power of the mobile station for communication, among other examples).

In some aspects, the network node may select a candidate transmission power to use with the selected signaling hardware. For example, the network node may select a transmission power of a mobile station laser that satisfies a threshold signal strength for uplink transmissions.

As shown by reference number 635, the mobile station may receive, and the network node may transmit, an indication of a first selection of a first type of signaling hardware and/or a transmission direction. The transmission direction may be associated with using the first type of signaling hardware or using a second type of signaling hardware that is configured to be used in addition to the first type of signaling hardware. In some aspects, the first selection may indicate a selection of a candidate transmission power to use with the first type of signaling hardware.

In some aspects, the first selection may be a selection of a type of signaling hardware from the supported types of signaling hardware as indicated to the network node. In some aspects, the first selection may indicate selection of two or more of the supported types of signaling hardware. For example, the first selection may indicate a first type of signaling hardware and a second type of signaling hardware. In some aspects, the first selection may indicate a first type of signaling hardware (e.g., mobile station laser) to add to usage of a second type of signaling hardware (e.g., MRR).

As shown by reference number 640, the mobile station may configure the first type of signaling hardware for communication with the network node. For example, the mobile station may activate hardware for generating and transmitting signaling (e.g., via a laser and/or an RF antenna group) and/or a reflective signaling hardware (e.g., MRR).

As shown by reference number 645, the network node and the mobile station may communicate using the first signaling hardware. For example, the mobile station may generate and transmit signals using a first signaling hardware and/or may modulate and reflect signals using a second signaling hardware.

As shown by reference number 650, the mobile station may transmit, and the network node may receive, a request to update the first selection. For example, the mobile station may transmit the request to update the first selection based at least in part on a change in power parameters and/or a power state of the mobile station. In some aspects, the mobile station may transmit the request to update the first selection based at least in part on a failure to satisfy an AoD parameters for communicating with the network node using the first signaling hardware.

As shown by reference number 655, the mobile station may receive, and the network node may transmit, an indication to use a second selection of a second signaling hardware and/or an updated transmission direction. In some aspects, the network node may transmit the indication to use the second selection and/or the updated transmission direction based at least in part on the request to update the first selection. In some aspects, the network node may transmit the indication to use the second selection and/or the updated transmission direction independently from (e.g., in the absence of) the request to update the first selection.

As shown by reference number 660, the mobile station may configure the second type of signaling hardware. For example, the mobile station may activate hardware for generating and transmitting signaling (e.g., via a laser and/or an RF antenna group) and/or a reflective signaling hardware (e.g., MRR). In some aspects, the mobile station may configure a transmission direction for using the second type of signaling hardware. The transmission direction may be based at least in part on an indicated transmission direction (e.g., as indicated by the network node) or may be based at least in part on an AoA of downlink signals. For example, the mobile station may identify an AoA of downlink signals from the network node and transmit uplink signals with an AoD that is 180 degrees from the AoA of the downlink signals.

Configuring the second type of signaling hardware (e.g., in alternative to, or in addition to, the first type of signaling hardware) may be considered an update of the first selection. In some aspects, the mobile station may update the first selection based at least in part on an estimated signal strength of signaling from the mobile station as observed by the network node, an indication of an update from the network node, an identification of a change in channel conditions, and/or an update to a power state of the mobile station. In some aspects, the mobile station may update the first selection only based at least in part on receiving the indication to use the second selection from the network node. In some aspects, the mobile station may autonomously update (e.g., without an explicit indication from the network node to update) the first selection to use the second type of signaling hardware.

As shown by reference number 665, network node and the mobile station may communicate using the second signaling hardware. For example, the mobile station may generate and transmit signals using only the second signaling hardware, or may modulate and reflect signals using the first signaling hardware and generate and transmit signals using the second signaling hardware (e.g., using multiple signaling hardware).

Based at least in part on supporting mobile station signaling hardware selection and/or reselection, the mobile station and the network node may adjust to changing conditions and/or mobile station states to optimize a link budget (e.g., received signal strength of uplink signals) and power consumption of the mobile station. For example, when a reflective signaling hardware (e.g., MRR) provides sufficient signal strength to the network node, the mobile station may be configured to conserve power resources that may have otherwise been used to generate and transmit uplink signaling (e.g., via a laser). Alternatively, when the reflective signaling hardware fails to provide sufficient signal strength to the network node, the mobile station may be configured to generate and transmit the uplink signaling (e.g., via the laser), which may reduce communication errors and conserve power, computing, communication, and/or network resources to detect and correct communication errors.

As indicated above, FIG. 6 is provided as an example. Other examples may differ from what is described with respect to FIG. 6.

Figure 7:
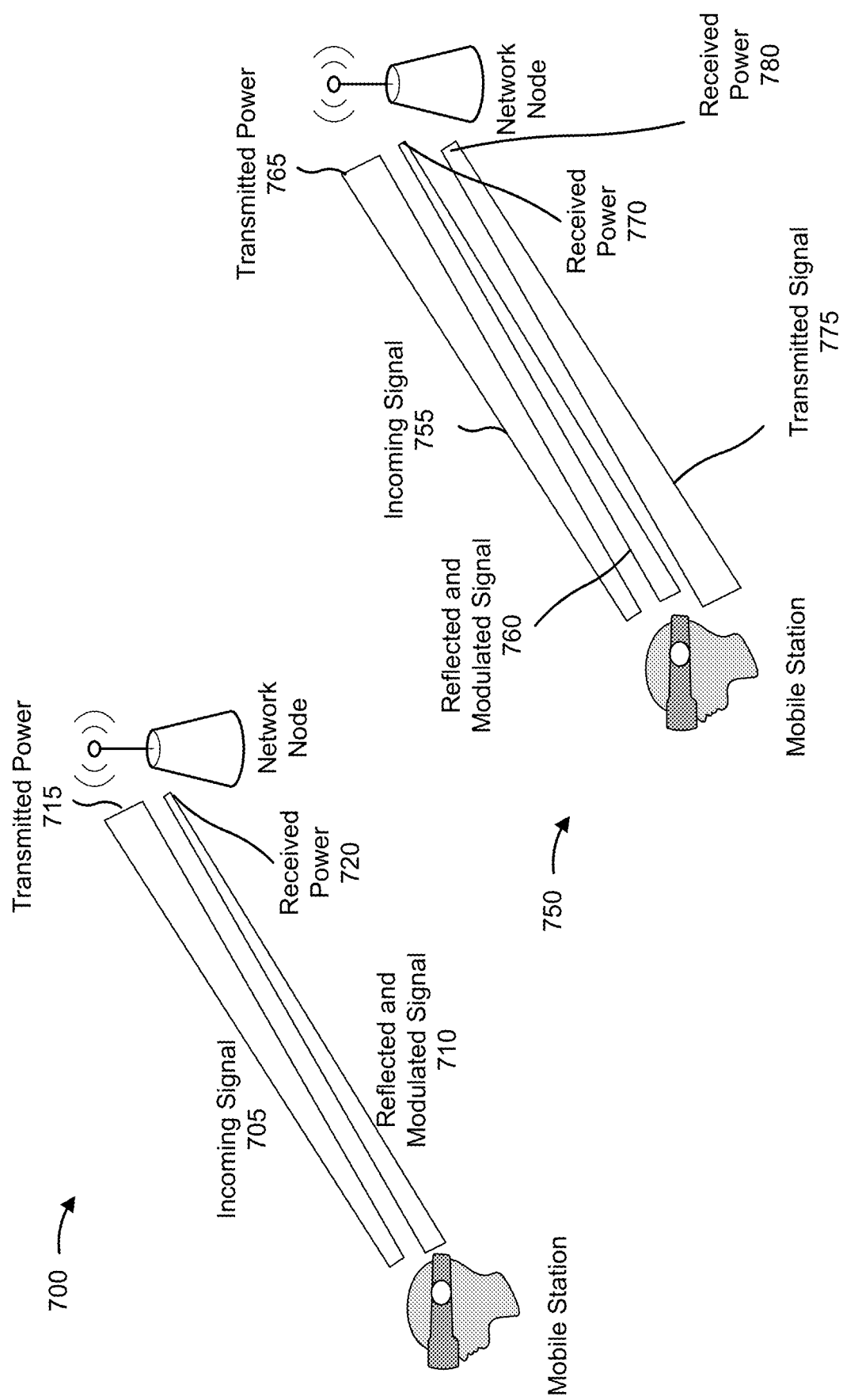
FIG. 7 is a diagram illustrating examples of OWC, in accordance with the present disclosure.

FIG. 7 is a diagram illustrating examples 700 and 750 of OWC, in accordance with the present disclosure. As shown in FIG. 7, a mobile station and a network node may communicate using OWC.

As shown in example 700, the mobile station may receive an incoming signal 705 from the network node. The mobile station may output, based at least in part on reflecting and modulating the incoming signal 705, a reflected and modulated signal 710 toward the network node.

Based at least in part on propagation over the air, the network node may transmit the incoming signal 705 with a transmitted power 715 and may receive the reflected and modulated signal 710 with a received power 720. In some examples, the transmitted power 715 may be reduced by a factor of a transmission distance with a power of two. In this way, the transmitted power 715 may be reduced by a factor of a distance between the mobile station and the network node with a power of two when it arrives at the mobile station, and may be reduced again by a factor of the distance between the mobile station and the network node with a power of two when it arrives at the network node. Based at least in part on using a reflected signal, signaling travels 2× the distance between the mobile station and the network node, and the transmitted power 715 is reduced by a factor of the distance between the mobile station and the network node with a power of four before being received with the received power 720.

In some examples, reduction of the transmitted power 515 by a factor of the distance between the mobile station and the network node with a power of four is acceptable based at least in part on the received power 720 being sufficiently high for reception and demodulation by the network node. Based at least in part the received power 720 being sufficiently high (e.g., satisfying a threshold), the network node may select signaling hardware associated with reflecting and modulating the incoming signal for communication with the network node. In this way, the mobile station may conserve power resources relative to generating and transmitting a modulated signal.

In some aspects, the received power 720 may be insufficient (e.g., failing to satisfy the threshold for communication with the network node). Based at least in part on the received power 720 being insufficient, the network node may indicate to use signaling hardware (e.g., a mobile station laser) associated with generating and transmitting a signal for communication with the network node.

As shown in example 750, the mobile station may receive an incoming signal 755 from the network node. The mobile station may output, based at least in part on reflecting and modulating the incoming signal 755, a reflected and modulated signal 760 toward the network node. As in example 700, the incoming signal 755 may be transmitted with a transmitted power 765 by the network node and the network node may receive the reflected and modulated signal 760 with a received power 770.

Based at least in part on the received power 770 being insufficient for reception and demodulation of the reflected and modulated signal 760, the network node may indicate to use an additional signaling hardware of the mobile station (e.g., a mobile station laser). In some aspects, the network node may indicate to use the additional signaling hardware along with the signaling hardware associated with the reflected and modulated signal 760. In some aspects, the network node may indicate to disable the reflected and modulated signal 760 when using the additional signaling hardware.

As shown in example 750, the mobile station may transmit a transmitted signal 775 to the network node that is received with a received power 780. For example, the mobile station may generate and transmit the transmitted signal. Generating and transmitting the transmitted signal 775 may include applying power amplification to a signal before transmitting. Application of the power amplification may consume power resources of the mobile station.

In some aspects where the signaling hardware associated with the reflected and modulated signal 760 is disabled, the network node may receive the transmitted signal with the received power 780 as a total received power. In some aspects where the signaling hardware associated with the reflected and modulated signal 760 is enabled with the additional signaling hardware, a received power may be a sum of the received power 770 and the received power 780. In this case, the reflected and modulated signal 760 and the transmitted signal 775 may have a same modulation and/or waveform. Additionally, or alternatively, the reflected and modulated signal 760 and the transmitted signal 775 may be received at the network node with a timing offset based at least in part on different propagation times. In this way, the reflected and modulated signal 760 and the transmitted signal 775 may cause mutual inter-symbol interference as a trade-off to an increased received power at the network node.

As indicated above, FIG. 7 is provided as an example. Other examples may differ from what is described with regard to FIG. 7.

Figure 8:
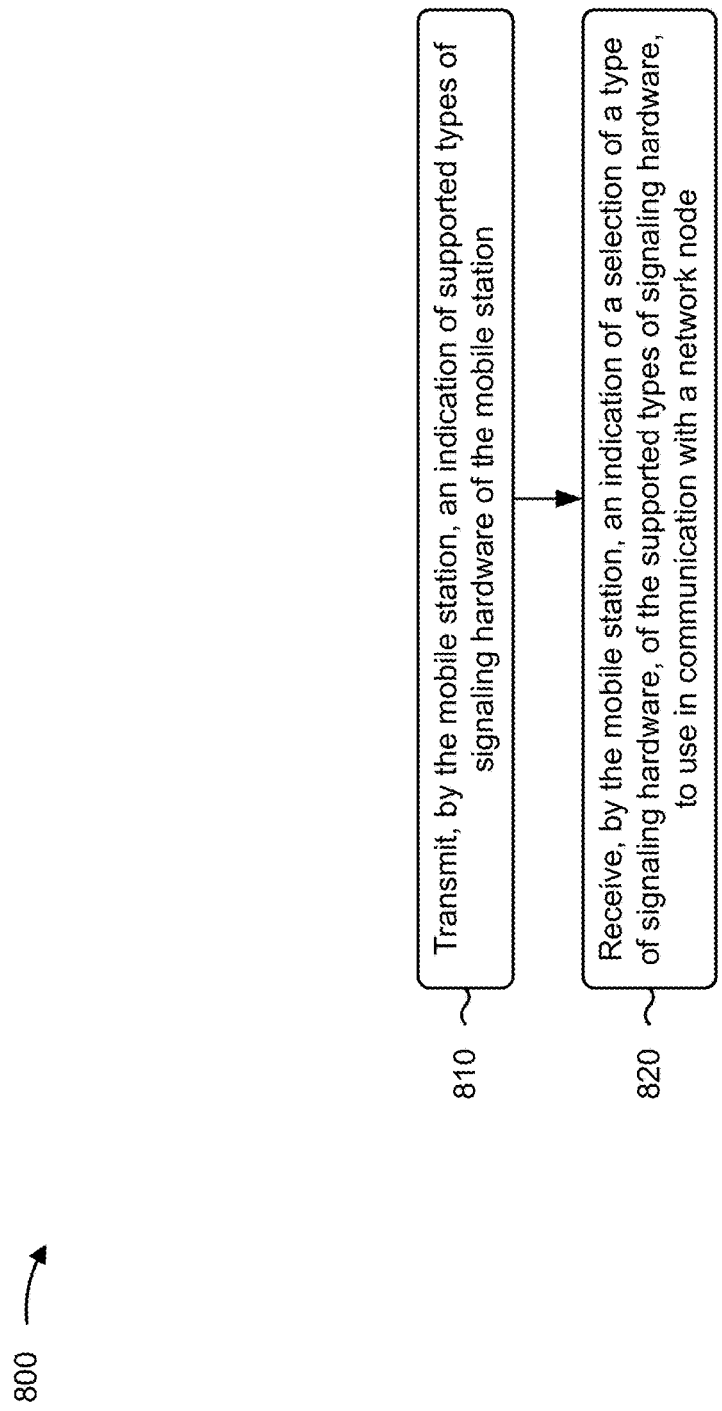
FIG. 8 is a diagram illustrating an example process performed, for example, by a mobile station, in accordance with the present disclosure.

FIG. 8 is a diagram illustrating an example process 800 performed, for example, by a mobile station, in accordance with the present disclosure. Example process 800 is an example where the mobile station (e.g., mobile station 120) performs operations associated with selection of user equipment signaling hardware selection.

As shown in FIG. 8, in some aspects, process 800 may include transmitting an indication of supported types of signaling hardware of the mobile station (block 810). For example, the mobile station (e.g., using communication manager 140 and/or transmission component 1004, depicted in FIG. 10) may transmit an indication of supported types of signaling hardware of the mobile station, as described above.

As further shown in FIG. 8, in some aspects, process 800 may include receiving an indication of a selection of a type of signaling hardware, of the supported types of signaling hardware, to use in communication with a network node (block 820). For example, the mobile station (e.g., using communication manager 140 and/or reception component 1002, depicted in FIG. 10) may receive an indication of a selection of a type of signaling hardware, of the supported types of signaling hardware, to use in communication with a network node, as described above.

Process 800 may include additional aspects, such as any single aspect or any combination of aspects described below and/or in connection with one or more other processes described elsewhere herein.

In a first aspect, the supported types of signaling hardware comprise one or more of reflective signaling hardware, radio frequency signaling hardware, or optical wireless communication hardware.

In a second aspect, alone or in combination with the first aspect, the reflective signaling hardware comprises an MRR or a RIS.

In a third aspect, alone or in combination with one or more of the first and second aspects, the indication of the selection of the type of signaling hardware comprises an indication of a selection of two or more of the supported types of signaling hardware.

In a fourth aspect, alone or in combination with one or more of the first through third aspects, process 800 includes transmitting one or more of an indication of power consumption parameters associated with the supported types of signaling hardware of the mobile station, an indication of multiple candidate transmission powers associated with the type of signaling hardware, an indication of a half power beam width associated with the type of signaling hardware, an indication of supported angles of departure associated with the type of signaling hardware, an indication of a distance to waist associated with the type of signaling hardware, or an indication of power loss associated with reflection.

In a fifth aspect, alone or in combination with one or more of the first through fourth aspects, the indication of the selection of the type of signaling hardware comprises an indication of a selection of a candidate transmission power to use with the type of signaling hardware.

In a sixth aspect, alone or in combination with one or more of the first through fifth aspects, the selection of the type of signaling hardware is based at least in part on one or more of power consumption parameters associated with supported types of hardware of the mobile station, a link budget of a link between the mobile station and the network node, or a power state of the mobile station.

In a seventh aspect, alone or in combination with one or more of the first through sixth aspects, process 800 includes updating the selection of the type of signaling hardware or a transmission power used with the type of signaling hardware based at least in part on one or more of an estimated signal strength of signaling from the mobile station as observed by the network node, an indication of an update from the network node, an identification of a change in channel conditions, or an update to a power state of the mobile station.

In an eighth aspect, alone or in combination with one or more of the first through seventh aspects, process 800 includes transmitting a request to update the selection of the type of signaling hardware, wherein the indication of the update from the network node is based at least in part on the request to update the selection of the type of signaling hardware.

In a ninth aspect, alone or in combination with one or more of the first through eighth aspects, process 800 includes communicating, before receiving the indication of the selection of the type of signaling hardware, with the network node using a first type of signaling hardware that is different from the type of signaling hardware, wherein the type of signaling hardware is a second type of signaling hardware, and communicating, after receiving the indication of the selection of the type of signaling hardware, with the network node using the second type of signaling hardware.

In a tenth aspect, alone or in combination with one or more of the first through ninth aspects, communicating, after receiving the indication of the selection of the type of signaling hardware, with the network node using the second type of signaling hardware comprises communicating with the network node using the second type of signaling hardware and the first type of signaling hardware.

In an eleventh aspect, alone or in combination with one or more of the first through tenth aspects, process 800 includes receiving an indication of a transmission direction for communication with the network node using the type of signaling hardware, wherein the type of signaling hardware uses a mobile-station-configured directional transmission.

In a twelfth aspect, alone or in combination with one or more of the first through eleventh aspects, process 800 includes identifying, based at least in part on an angle of arrival of a communication received via the network node, a transmission direction for communication with the network node using the type of signaling hardware, wherein the type of signaling hardware uses a mobile-station-configured directional transmission.

In a thirteenth aspect, alone or in combination with one or more of the first through twelfth aspects, process 800 includes receiving, by the mobile station, a resource allocation for signaling to the network node using the supported types of signaling hardware of the mobile station, and providing, by the mobile station, the signaling to the network node using the supported types of signaling hardware of the mobile station based at least in part on the resource allocation, wherein the selection of the type of signaling hardware is based at least in part on providing of the signaling to the network node using the supported types of signaling hardware of the mobile station.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
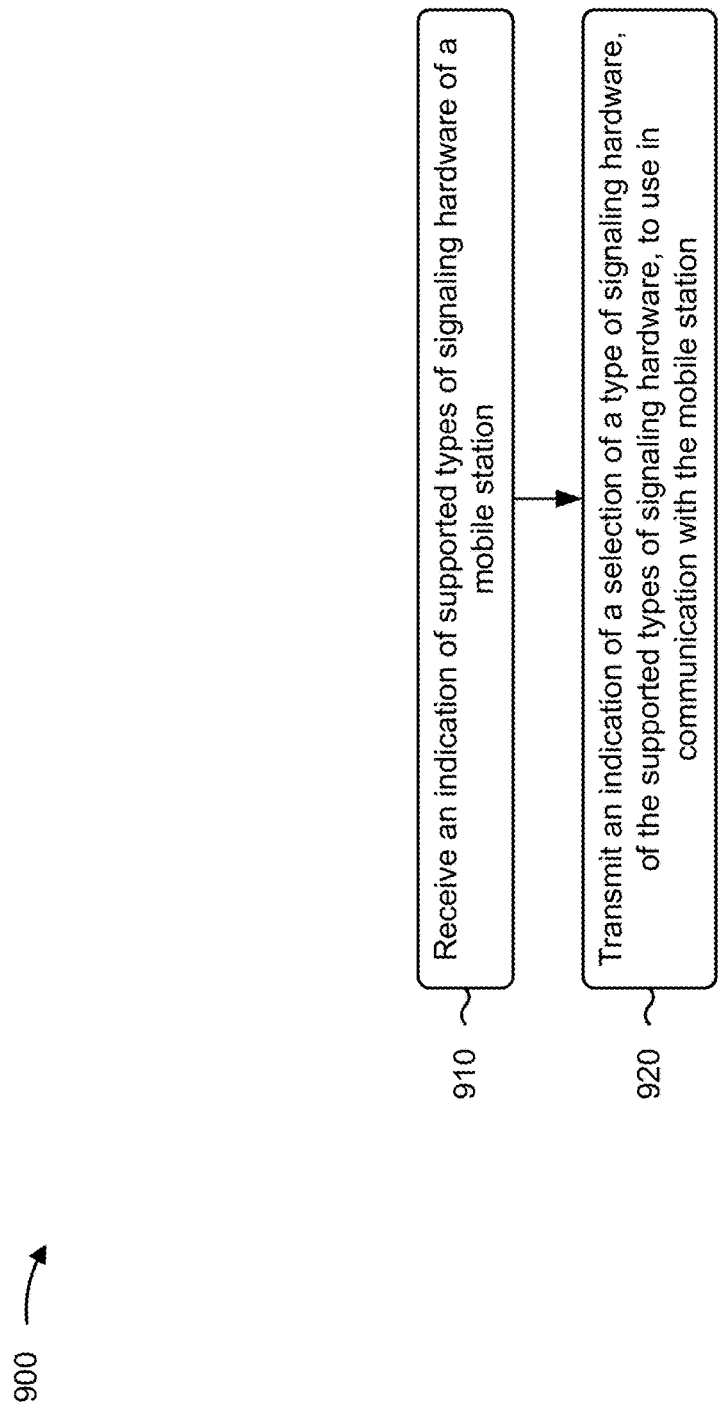
FIG. 9 is a diagram illustrating an example process performed, for example, by a network node, in accordance with the present disclosure.

FIG. 9 is a diagram illustrating an example process 900 performed, for example, by a network node, in accordance with the present disclosure. Example process 900 is an example where the network node (e.g., network node 110) performs operations associated with selection of user equipment signaling hardware selection.

As shown in FIG. 9, in some aspects, process 900 may include receiving an indication of supported types of signaling hardware of a mobile station (block 910). For example, the network node (e.g., using communication manager 150 and/or reception component 1102, depicted in FIG. 11) may receive an indication of supported types of signaling hardware of a mobile station, as described above.

As further shown in FIG. 9, in some aspects, process 900 may include transmitting an indication of a selection of a type of signaling hardware, of the supported types of signaling hardware, to use in communication with the mobile station (block 920). For example, the network node (e.g., using communication manager 150 and/or transmission component 1104, depicted in FIG. 11) may transmit an indication of a selection of a type of signaling hardware, of the supported types of signaling hardware, to use in communication with the mobile station, as described above.

Process 900 may include additional aspects, such as any single aspect or any combination of aspects described below and/or in connection with one or more other processes described elsewhere herein.

In a first aspect, the supported types of signaling hardware comprise one or more of reflective signaling hardware, radio frequency signaling hardware, or optical wireless communication hardware.

In a second aspect, alone or in combination with the first aspect, the reflective signaling hardware comprises a MRR or a RIS.

In a third aspect, alone or in combination with one or more of the first and second aspects, the indication of the selection of the type of signaling hardware comprises an indication of a selection of two or more of the supported types of signaling hardware.

In a fourth aspect, alone or in combination with one or more of the first through third aspects, process 900 includes transmitting one or more of an indication of power consumption parameters associated with the supported types of signaling hardware of the mobile station, an indication of multiple candidate transmission powers associated with the type of signaling hardware, an indication of a half power beam width associated with the type of signaling hardware, an indication of supported angles of departure associated with the type of signaling hardware, an indication of a distance to waist associated with the type of signaling hardware, or an indication of power loss associated with reflection.

In a fifth aspect, alone or in combination with one or more of the first through fourth aspects, the indication of the selection of the type of signaling hardware comprises an indication of a selection of a candidate transmission power to use with the type of signaling hardware.

In a sixth aspect, alone or in combination with one or more of the first through fifth aspects, the selection of the type of signaling hardware is based at least in part on one or more of power consumption parameters associated with supported types of hardware of the mobile station, a link budget of a link between the mobile station and the network node, or a power state of the mobile station.

In a seventh aspect, alone or in combination with one or more of the first through sixth aspects, process 900 includes updating the selection of the type of signaling hardware or a transmission power used with the type of signaling hardware based at least in part on one or more of an estimated signal strength of signaling from the mobile station as observed by the network node, an indication of an update to the mobile station, an identification of a change in channel conditions, or an update to a power state of the mobile station.

In an eighth aspect, alone or in combination with one or more of the first through seventh aspects, process 900 includes receiving a request to update the selection of the type of signaling hardware, wherein the indication of the update to the mobile station is based at least in part on the request to update the selection of the type of signaling hardware.

In a ninth aspect, alone or in combination with one or more of the first through eighth aspects, process 900 includes communicating, before receiving the indication of the selection of the type of signaling hardware, with the mobile station using a first type of signaling hardware that is different from the type of signaling hardware, wherein the type of signaling hardware is a second type of signaling hardware, and communicating, after receiving the indication of the selection of the type of signaling hardware, with the mobile station using the second type of signaling hardware.

In a tenth aspect, alone or in combination with one or more of the first through ninth aspects, communicating, after receiving the indication of the selection of the type of signaling hardware, with the mobile station using the second type of signaling hardware comprises communicating with the mobile station using the second type of signaling hardware and the first type of signaling hardware.

In an eleventh aspect, alone or in combination with one or more of the first through tenth aspects, process 900 includes transmitting an indication of a transmission direction for communication with the network node using the type of signaling hardware, wherein the type of signaling hardware uses a mobile-station-configured directional transmission.

In a twelfth aspect, alone or in combination with one or more of the first through eleventh aspects, process 900 includes transmitting a resource allocation for signaling by the mobile station using the supported types of signaling hardware of the mobile station, and receiving the signaling that is provided using the supported types of signaling hardware of the mobile station based at least in part on the resource allocation, wherein the selection of the type of signaling hardware is based at least in part on receiving the signaling that is provided using the supported types of signaling hardware of the mobile station.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
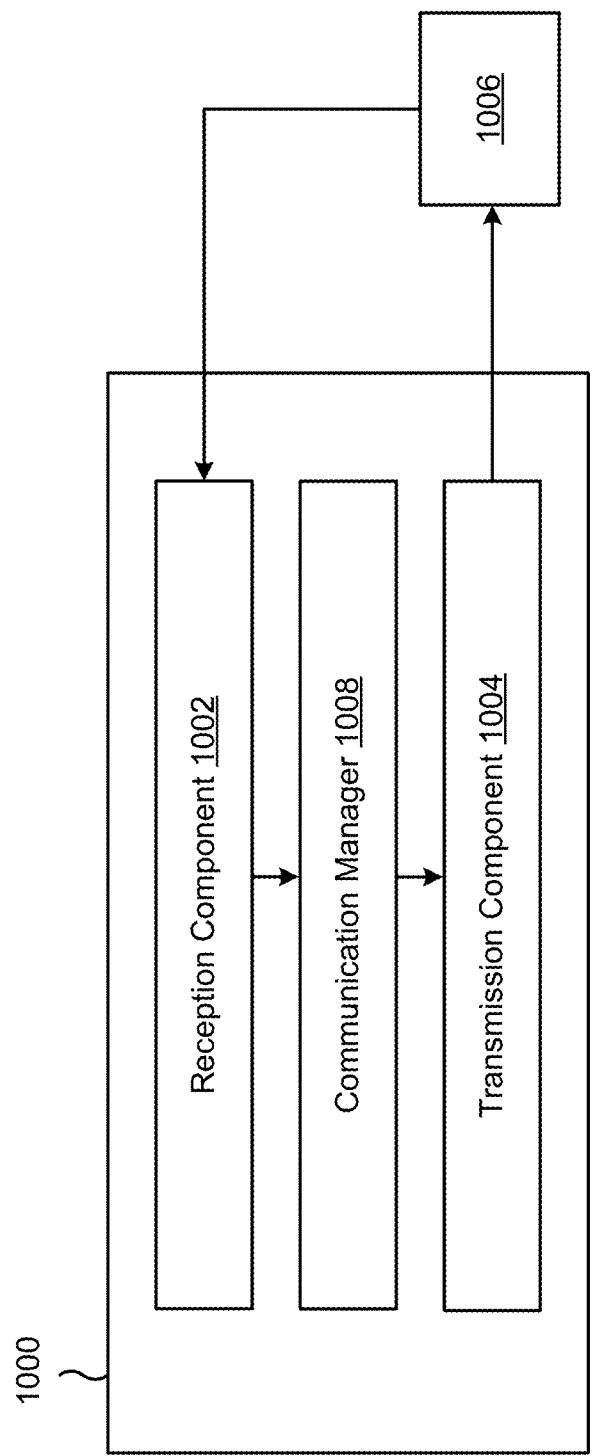
FIG. 10 is a diagram of an example apparatus for wireless communication, in accordance with the present disclosure.

FIG. 10 is a diagram of an example apparatus 1000 for wireless communication, in accordance with the present disclosure. The apparatus 1000 may be a mobile station, or a mobile station may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a mobile station, a base station, or another wireless communication device) using the reception component 1002 and the transmission component 1004. As further shown, the apparatus 1000 may include a communication manager (e.g., the communication manager 140).

In some aspects, the apparatus 1000 may be configured to perform one or more operations described herein in connection with FIGS. 6-7 Additionally, or alternatively, the apparatus 1000 may be configured to perform one or more processes described herein, such as process 800 of FIG. 8. In some aspects, the apparatus 1000 and/or one or more components shown in FIG. 10 may include one or more components of the mobile station described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the mobile station described in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the mobile station described in connection with FIG. 2. In some aspects, the transmission component 1004 may be co-located with the reception component 1002 in a transceiver.

The transmission component 1004 may transmit an indication of supported types of signaling hardware of the mobile station. The reception component 1002 may receive an indication of a selection of a type of signaling hardware, of the supported types of signaling hardware, to use in communication with a network node.

The transmission component 1004 may transmit one or more of an indication of power consumption parameters associated with the supported types of signaling hardware of the mobile station, an indication of multiple candidate transmission powers associated with the type of signaling hardware, an indication of a half power beam width associated with the type of signaling hardware, an indication of supported angles of departure associated with the type of signaling hardware, an indication of a distance to waist associated with the type of signaling hardware, or an indication of power loss associated with reflection.

The communication manager 1008 may update the selection of the type of signaling hardware or a transmission power used with the type of signaling hardware based at least in part on one or more of an estimated signal strength of signaling from the mobile station as observed by the network node, an indication of an update from the network node, an identification of a change in channel conditions, or an update to a power state of the mobile station.

The transmission component 1004 may transmit a request to update the selection of the type of signaling hardware wherein the indication of the update from the network node is based at least in part on the request to update the selection of the type of signaling hardware.

The reception component 1002, the transmission component 1004, and/or the communication manager 1008 may communicate, before receiving the indication of the selection of the type of signaling hardware, with the network node using a first type of signaling hardware that is different from the type of signaling hardware wherein the type of signaling hardware is a second type of signaling hardware.

The reception component 1002, the transmission component 1004, and/or the communication manager 1008 may communicate, after receiving the indication of the selection of the type of signaling hardware, with the network node using the second type of signaling hardware.

The reception component 1002 may receive an indication of a transmission direction for communication with the network node using the type of signaling hardware wherein the type of signaling hardware uses a mobile-station-configured directional transmission.

The communication manager 1008 may identify, based at least in part on an angle of arrival of a communication received via the network node, a transmission direction for communication with the network node using the type of signaling hardware wherein the type of signaling hardware uses a mobile-station-configured directional transmission.

The reception component 1002 may receive a resource allocation for signaling to the network node using the supported types of signaling hardware of the mobile station.

The transmission component 1002 may provide the signaling to the network node using the supported types of signaling hardware of the mobile station based at least in part on the resource allocation wherein the selection of the type of signaling hardware is based at least in part on providing of the signaling to the network node using the supported types of signaling hardware of the mobile station.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

Figure 11:
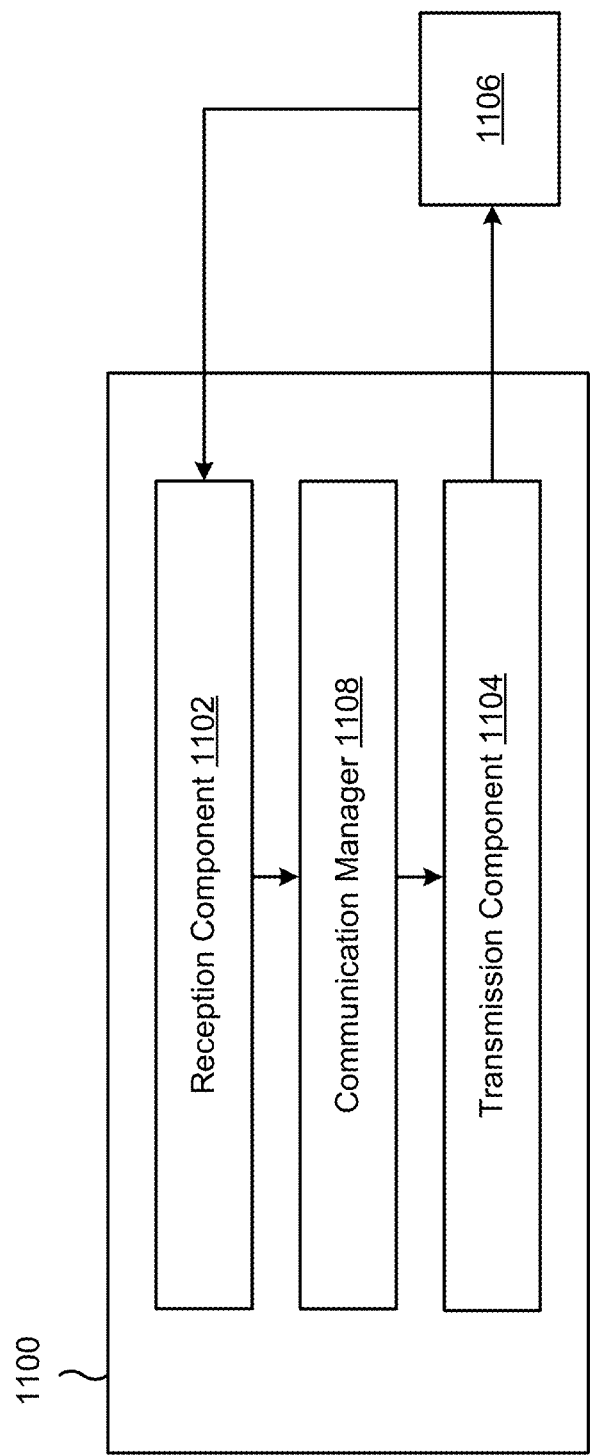
FIG. 11 is a diagram of an example apparatus for wireless communication, in accordance with the present disclosure.

FIG. 11 is a diagram of an example apparatus 1100 for wireless communication, in accordance with the present disclosure. The apparatus 1100 may be a network node, or a network node may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a mobile station, a base station, or another wireless communication device) using the reception component 1102 and the transmission component 1104. As further shown, the apparatus 1100 may include a communication manager 1108 (e.g., the communication manager 150).

In some aspects, the apparatus 1100 may be configured to perform one or more operations described herein in connection with FIGS. 6-7. Additionally, or alternatively, the apparatus 1100 may be configured to perform one or more processes described herein, such as process 900 of FIG. 9. In some aspects, the apparatus 1100 and/or one or more components shown in FIG. 11 may include one or more components of the network node described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a MIMO detector, a receive processor, a controller/processor, a memory, or a combination thereof, of the network node described in connection with FIG. 2.

The transmission component 1104 may transmit communications, such as reference signals, control information, data communications, or a combination thereof, to the apparatus 1106. In some aspects, one or more other components of the apparatus 1100 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modem, a modulator, a transmit MIMO processor, a transmit processor, a controller/processor, a memory, or a combination thereof, of the network node described in connection with FIG. 2. In some aspects, the transmission component 1104 may be co-located with the reception component 1102 in a transceiver.

The reception component 1102 may receive an indication of supported types of signaling hardware of a mobile station. The transmission component 1104 may transmit an indication of a selection of a type of signaling hardware, of the supported types of signaling hardware, to use in communication with the mobile station.

The transmission component 1104 may transmit one or more of an indication of power consumption parameters associated with the supported types of signaling hardware of the mobile station, an indication of multiple candidate transmission powers associated with the type of signaling hardware, an indication of a half power beam width associated with the type of signaling hardware, an indication of supported angles of departure associated with the type of signaling hardware, an indication of a distance to waist associated with the type of signaling hardware, or an indication of power loss associated with reflection.

The communication manager 1108 may update the selection of the type of signaling hardware or a transmission power used with the type of signaling hardware based at least in part on one or more of an estimated signal strength of signaling from the mobile station as observed by the network node, an indication of an update to the mobile station, an identification of a change in channel conditions, or an update to a power state of the mobile station.

The reception component 1102 may receive a request to update the selection of the type of signaling hardware wherein the indication of the update to the mobile station is based at least in part on the request to update the selection of the type of signaling hardware.

The reception component 1102, the transmission component 1104, and/or the communication manager 1108 may communicate, before receiving the indication of the selection of the type of signaling hardware, with the mobile station using a first type of signaling hardware that is different from the type of signaling hardware wherein the type of signaling hardware is a second type of signaling hardware.

The reception component 1102, the transmission component 1104, and/or the communication manager 1108 may communicate, after receiving the indication of the selection of the type of signaling hardware, with the mobile station using the second type of signaling hardware.

The transmission component 1104 may transmit an indication of a transmission direction for communication with the network node using the type of signaling hardware wherein the type of signaling hardware uses a mobile-station-configured directional transmission.

The transmission component 1104 may transmit a resource allocation for signaling by the mobile station using the supported types of signaling hardware of the mobile station receiving the signaling that is provided using the supported types of signaling hardware of the mobile station based at least in part on the resource allocation.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

The following provides an overview of some Aspects of the present disclosure:

Aspect 1: A method of wireless communication performed by a mobile station, comprising: transmitting, by the mobile station, an indication of supported types of signaling hardware of the mobile station; and receiving, by the mobile station, an indication of a selection of a type of signaling hardware, of the supported types of signaling hardware, to use in communication with a network node.

Aspect 2: The method of Aspect 1, wherein the supported types of signaling hardware comprise one or more of: reflective signaling hardware, radio frequency signaling hardware, or optical wireless communication hardware.

Aspect 3: The method of Aspect 2, wherein the reflective signaling hardware comprises a modulated retro reflector (MRR) or a reflective intelligent surface (RIS).

Aspect 4: The method of any of Aspects 1-3, wherein the indication of the selection of the type of signaling hardware comprises: an indication of a selection of two or more of the supported types of signaling hardware.

Aspect 5: The method of any of Aspects 1-4, further comprising transmitting one or more of: an indication of power consumption parameters associated with the supported types of signaling hardware of the mobile station, an indication of multiple candidate transmission powers associated with the type of signaling hardware, an indication of a half power beam width associated with the type of signaling hardware, an indication of supported angles of departure associated with the type of signaling hardware, an indication of a distance to waist associated with the type of signaling hardware, or an indication of power loss associated with reflection.

Aspect 6: The method of Aspect 5, wherein the indication of the selection of the type of signaling hardware comprises an indication of a selection of a candidate transmission power to use with the type of signaling hardware.

Aspect 7: The method of any of Aspects 1-6, wherein the selection of the type of signaling hardware is based at least in part on one or more of: power consumption parameters associated with supported types of hardware of the mobile station, a link budget of a link between the mobile station and the network node, or a power state of the mobile station.

Aspect 8: The method of any of Aspects 1-7, further comprising updating the selection of the type of signaling hardware or a transmission power used with the type of signaling hardware based at least in part on one or more of: an estimated signal strength of signaling from the mobile station as observed by the network node, an indication of an update from the network node, an identification of a change in channel conditions, or an update to a power state of the mobile station.

Aspect 9: The method of Aspect 8, further comprising: transmitting a request to update the selection of the type of signaling hardware, wherein the indication of the update from the network node is based at least in part on the request to update the selection of the type of signaling hardware.

Aspect 10: The method of any of Aspects 1-9, further comprising: communicating, before receiving the indication of the selection of the type of signaling hardware, with the network node using a first type of signaling hardware that is different from the type of signaling hardware, wherein the type of signaling hardware is a second type of signaling hardware; and communicating, after receiving the indication of the selection of the type of signaling hardware, with the network node using the second type of signaling hardware.

Aspect 11: The method of Aspect 10, wherein communicating, after receiving the indication of the selection of the type of signaling hardware, with the network node using the second type of signaling hardware comprises: communicating with the network node using the second type of signaling hardware and the first type of signaling hardware.

Aspect 12: The method of any of Aspects 1-11, further comprising: receiving an indication of a transmission direction for communication with the network node using the type of signaling hardware, wherein the type of signaling hardware uses a mobile-station-configured directional transmission.

Aspect 13: The method of any of Aspects 1-12, further comprising: identifying, based at least in part on an angle of arrival of a communication received via the network node, a transmission direction for communication with the network node using the type of signaling hardware, wherein the type of signaling hardware uses a mobile-station-configured directional transmission.

Aspect 14: The method of any of Aspects 1-13, further comprising: receiving, by the mobile station, a resource allocation for signaling to the network node using the supported types of signaling hardware of the mobile station; and providing, by the mobile station, the signaling to the network node using the supported types of signaling hardware of the mobile station based at least in part on the resource allocation, wherein the selection of the type of signaling hardware is based at least in part on providing of the signaling to the network node using the supported types of signaling hardware of the mobile station.

Aspect 15: A method of wireless communication performed by a network node, comprising: receiving an indication of supported types of signaling hardware of a mobile station; and transmitting an indication of a selection of a type of signaling hardware, of the supported types of signaling hardware, to use in communication with the mobile station.

Aspect 16: The method of Aspect 15, wherein the supported types of signaling hardware comprise one or more of: reflective signaling hardware, radio frequency signaling hardware, or optical wireless communication hardware.

Aspect 17: The method of Aspect 16, wherein the reflective signaling hardware comprises a modulated retro reflector (MRR) or a reflective intelligent surface (RIS).

Aspect 18: The method of any of Aspects 15-17, wherein the indication of the selection of the type of signaling hardware comprises: an indication of a selection of two or more of the supported types of signaling hardware.

Aspect 19: The method of any of Aspects 15-18, further comprising transmitting one or more of: an indication of power consumption parameters associated with the supported types of signaling hardware of the mobile station, an indication of multiple candidate transmission powers associated with the type of signaling hardware, an indication of a half power beam width associated with the type of signaling hardware, an indication of supported angles of departure associated with the type of signaling hardware, an indication of a distance to waist associated with the type of signaling hardware, or an indication of power loss associated with reflection.

Aspect 20: The method of Aspect 19, wherein the indication of the selection of the type of signaling hardware comprises an indication of a selection of a candidate transmission power to use with the type of signaling hardware.

Aspect 21: The method of any of Aspects 15-20, wherein the selection of the type of signaling hardware is based at least in part on one or more of: power consumption parameters associated with supported types of hardware of the mobile station, a link budget of a link between the mobile station and the network node, or a power state of the mobile station.

Aspect 22: The method of any of Aspects 15-21, further comprising updating the selection of the type of signaling hardware or a transmission power used with the type of signaling hardware based at least in part on one or more of: an estimated signal strength of signaling from the mobile station as observed by the network node, an indication of an update to the mobile station, an identification of a change in channel conditions, or an update to a power state of the mobile station.

Aspect 23: The method of Aspect 22, further comprising: receiving a request to update the selection of the type of signaling hardware, wherein the indication of the update to the mobile station is based at least in part on the request to update the selection of the type of signaling hardware.

Aspect 24: The method of any of Aspects 15-23, further comprising: communicating, before receiving the indication of the selection of the type of signaling hardware, with the mobile station using a first type of signaling hardware that is different from the type of signaling hardware, wherein the type of signaling hardware is a second type of signaling hardware; and communicating, after receiving the indication of the selection of the type of signaling hardware, with the mobile station using the second type of signaling hardware.

Aspect 25: The method of Aspect 24, wherein communicating, after receiving the indication of the selection of the type of signaling hardware, with the mobile station using the second type of signaling hardware comprises: communicating with the mobile station using the second type of signaling hardware and the first type of signaling hardware.

Aspect 26: The method of any of Aspects 15-25, further comprising: transmitting an indication of a transmission direction for communication with the network node using the type of signaling hardware, wherein the type of signaling hardware uses a mobile-station-configured directional transmission.

Aspect 27: The method of any of Aspects 15-26, further comprising: transmitting a resource allocation for signaling by the mobile station using the supported types of signaling hardware of the mobile station; and receiving the signaling that is provided using the supported types of signaling hardware of the mobile station based at least in part on the resource allocation, wherein the selection of the type of signaling hardware is based at least in part on receiving the signaling that is provided using the supported types of signaling hardware of the mobile station. wherein the selection of the type of signaling hardware is based at least in part on receiving the signaling that is provided using the supported types of signaling hardware of the mobile station.

Aspect 28: An apparatus for wireless communication at a device, comprising a processor; memory coupled with the processor; and instructions stored in the memory and executable by the processor to cause the apparatus to perform the method of one or more of Aspects 1-27.

Aspect 29: A device for wireless communication, comprising a memory and one or more processors coupled to the memory, the one or more processors configured to perform the method of one or more of Aspects 1-27.

Aspect 30: An apparatus for wireless communication, comprising at least one means for performing the method of one or more of Aspects 1-27.

Aspect 31: A non-transitory computer-readable medium storing code for wireless communication, the code comprising instructions executable by a processor to perform the method of one or more of Aspects 1-27.

Aspect 32: A non-transitory computer-readable medium storing a set of instructions for wireless communication, the set of instructions comprising one or more instructions that, when executed by one or more processors of a device, cause the device to perform the method of one or more of Aspects 1-27.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A mobile station for wireless communication, comprising:
   one or more memories; and
   one or more processors, based at least in part on information stored in the one or more memories, configured to:
      transmit an indication of supported types of signaling hardware of the mobile station;
      communicate with a network node using a first type of signaling hardware of the supported types of signaling hardware;
      receive, after communication with the network node using the first type of signaling hardware, an indication of a selection of a second type of signaling hardware, of the supported types of signaling hardware, to use in communication with the network node, wherein the second type of signaling hardware is different from the first type of signaling hardware; and
      communicate, after reception of the indication of the selection of the second type of signaling hardware, with the network node using the second type of signaling hardware.

2. The mobile station of claim 1, wherein the supported types of signaling hardware comprise one or more of:
   reflective signaling hardware,
   radio frequency signaling hardware, or
   optical wireless communication hardware.

3. The mobile station of claim 2, wherein the reflective signaling hardware comprises a modulated retro reflector (MRR) or a reflective intelligent surface (RIS).

4. The mobile station of claim 1, wherein the indication of the selection of the second type of signaling hardware comprises:
   an indication of a selection of two or more of the supported types of signaling hardware.

5. The mobile station of claim 1, wherein the one or more processors are further configured to transmit one or more of:
   an indication of power consumption parameters associated with the supported types of signaling hardware of the mobile station,
   an indication of multiple candidate transmission powers associated with the second type of signaling hardware,
   an indication of a half power beam width associated with the second type of signaling hardware,
   an indication of supported angles of departure associated with the second type of signaling hardware,
   an indication of a distance to waist associated with the second type of signaling hardware, or
   an indication of power loss associated with reflection.

6. The mobile station of claim 5, wherein the indication of the selection of the second type of signaling hardware comprises an indication of a selection of a candidate transmission power to use with the second type of signaling hardware.

7. The mobile station of claim 1, wherein the selection of the second type of signaling hardware is based at least in part on one or more of:
   power consumption parameters associated with supported types of hardware of the mobile station,
   a link budget of a link between the mobile station and the network node, or
   a power state of the mobile station.

8. The mobile station of claim 1, wherein the one or more processors are further configured to update the selection of the second type of signaling hardware or a transmission power used with the second type of signaling hardware based at least in part on one or more of:
- an estimated signal strength of signaling from the mobile station as observed by the network node,
- an indication of an update from the network node,
- an identification of a change in channel conditions, or
- an update to a power state of the mobile station.

9. The mobile station of claim 8, wherein the one or more processors are further configured to:
- transmit a request to update the selection of the second type of signaling hardware,
  - wherein of the update to the selection of the second type of signaling hardware is based at least in part on the request to update the selection of the second type of signaling hardware.

10. The mobile station of claim 1, wherein the one or more processors, to communicate, after reception of the indication of the selection of the second type of signaling hardware, with the network node using the second type of signaling hardware, are configured to:
- communicate with the network node using the second type of signaling hardware and the first type of signaling hardware.

11. The mobile station of claim 1, wherein the one or more processors are further configured to:
- receive an indication of a transmission direction for communication with the network node using the second type of signaling hardware,
  - wherein the second type of signaling hardware uses a mobile-station-configured directional transmission.

12. The mobile station of claim 1, wherein the one or more processors are further configured to:
- identify, based at least in part on an angle of arrival of a communication received via the network node, a transmission direction for communication with the network node using the second type of signaling hardware,
  - wherein the second type of signaling hardware uses a mobile-station-configured directional transmission.

13. The mobile station of claim 1, wherein the one or more processors are further configured to:
- receive a resource allocation for signaling to the network node using the supported types of signaling hardware of the mobile station; and
- provide the signaling to the network node using the supported types of signaling hardware of the mobile station based at least in part on the resource allocation,
  - wherein the selection of the second type of signaling hardware is based at least in part on provision of the signaling to the network node.

14. A network node for wireless communication, comprising:
- one or more memories; and
- one or more processors, based at least in part on information stored in the one or more memories, configured to:
  - receive an indication of supported types of signaling hardware of a mobile station;
  - communicate with the mobile station, wherein the mobile station uses a first type of signaling hardware of the supported types of signaling hardware for the communication;
  - transmit, after communication with the mobile station, an indication of a selection of a second type of signaling hardware, of the supported types of signaling hardware, the mobile station is to use in communication with the network node; and
  - communicate with the mobile station after transmission of the indication of the selection of the second type of signaling hardware, wherein the mobile station uses the second type of signaling hardware for the communication.

15. The network node of claim 14, wherein the supported types of signaling hardware comprise one or more of:
- reflective signaling hardware,
- radio frequency signaling hardware, or
- optical wireless communication hardware.

16. The network node of claim 15, wherein the reflective signaling hardware comprises a modulated retro reflector (MRR) or a reflective intelligent surface (RIS).

17. The network node of claim 14, wherein the indication of the selection of the second type of signaling hardware comprises:
- an indication of a selection of two or more of the supported types of signaling hardware.

18. The network node of claim 14, wherein the one or more processors are further configured to transmit one or more of:
- an indication of power consumption parameters associated with the supported types of signaling hardware of the mobile station,
- an indication of multiple candidate transmission powers associated with the second type of signaling hardware,
- an indication of a half power beam width associated with the second type of signaling hardware,
- an indication of supported angles of departure associated with the second type of signaling hardware,
- an indication of a distance to waist associated with the second type of signaling hardware, or
- an indication of power loss associated with reflection.

19. The network node of claim 18, wherein the indication of the selection of the second type of signaling hardware comprises an indication of a selection of a candidate transmission power to use with the second type of signaling hardware.

20. The network node of claim 14, wherein the selection of the second type of signaling hardware is based at least in part on one or more of:
- power consumption parameters associated with supported types of hardware of the mobile station,
- a link budget of a link between the mobile station and the network node, or
- a power state of the mobile station.

21. The network node of claim 14, wherein the one or more processors are further configured to update the selection of the second type of signaling hardware or a transmission power used with the second type of signaling hardware based at least in part on one or more of:
- an estimated signal strength of signaling from the mobile station as observed by the network node,
- an indication of an update to the mobile station,
- an identification of a change in channel conditions, or
- an update to a power state of the mobile station.

22. The network node of claim 21, wherein the one or more processors are further configured to:
- receive a request to update the selection of the second type of signaling hardware,
  - wherein of the update to the selection of the second type of signaling hardware is based at least in part on the request to update the selection of the second type of signaling hardware.

23. The network node of claim 15, wherein the one or more processors, to communicate with the mobile station after transmission of the indication of the selection of the second type of signaling hardware, are configured to:

communicate with the mobile station, wherein the mobile station uses the second type of signaling hardware and the first type of signaling hardware.

24. The network node of claim 14, wherein the one or more processors are further configured to:

transmit an indication of a transmission direction for communication with the network node using the second type of signaling hardware, wherein the second type of signaling hardware uses a mobile-station-configured directional transmission.

25. The network node of claim 14, wherein the one or more processors are further configured to:

transmit a resource allocation for signaling by the mobile station using the supported types of signaling hardware of the mobile station; and receive the signaling, wherein the mobile station uses the supported types of signaling hardware of the mobile station based at least in part on the resource allocation, wherein the selection of the second type of signaling hardware is based at least in part on reception of the signaling.

26. A method of wireless communication performed by a mobile station, comprising:

transmitting, by the mobile station, an indication of supported types of signaling hardware of the mobile station;

communicating with a network node using a first type of signaling hardware of the supported types of signaling hardware;

receiving, by the mobile station and after communicating with the network node using the first type of signaling hardware, an indication of a selection of a second type of signaling hardware, of the supported types of signaling hardware, to use in communication with the network node, wherein the second type of signaling hardware is different from the first type of signaling hardware; and communicating, after receiving the indication of the selection of the second type of signaling hardware, with the network node using the second type of signaling hardware.

27. The method of claim 26, further comprising:

receiving, by the mobile station, a resource allocation for signaling to the network node using the supported types of signaling hardware of the mobile station; and providing, by the mobile station, the signaling to the network node using the supported types of signaling hardware of the mobile station based at least in part on the resource allocation, wherein the selection of the second type of signaling hardware is based at least in part on providing the signaling to the network node.

28. A method of wireless communication performed by a network node, comprising:

receiving an indication of supported types of signaling hardware of a mobile station;

communicating with the mobile station, wherein the mobile station uses a first type of signaling hardware of the supported types of signaling hardware for the communicating;

transmitting, after communication with the mobile station, an indication of a selection of a second type of signaling hardware, of the supported types of signaling hardware, the mobile station is to use in communication with the network node; and communicating with the mobile station after transmitting the indication of the selection of the second type of signaling hardware, wherein the mobile station uses the second type of signaling hardware for the communication.

29. The method of claim 26, wherein the supported types of signaling hardware comprise one or more of:

reflective signaling hardware, radio frequency signaling hardware, or optical wireless communication hardware.

30. The method of claim 29, wherein the reflective signaling hardware comprises a modulated retro reflector (MRR) or a reflective intelligent surface (RIS).

\* \* \* \* \*